(12) United States Patent
Kishimoto et al.

(10) Patent No.: US 12,354,506 B2
(45) Date of Patent: Jul. 8, 2025

(54) ELECTRONIC APPARATUS

(71) Applicant: Samsung Display Co., Ltd., Yongin-si (KR)

(72) Inventors: Hirotsugu Kishimoto, Hwaseong-si (KR); Yongchan Jeon, Cheonan-si (KR); Chul Ho Jeong, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 216 days.

(21) Appl. No.: 17/985,514

(22) Filed: Nov. 11, 2022

(65) Prior Publication Data

US 2023/0215301 A1 Jul. 6, 2023

(30) Foreign Application Priority Data

Dec. 30, 2021 (KR) .................... 10-2021-0193068

(51) Int. Cl.
| | | |
|---|---|---|
| G02B 1/14 | (2015.01) | |
| G06F 1/16 | (2006.01) | |
| G06F 3/041 | (2006.01) | |
| G09F 9/30 | (2006.01) | |

(52) U.S. Cl.
CPC ............... *G09F 9/301* (2013.01); *G02B 1/14* (2015.01); *G06F 1/1652* (2013.01); *G06F 3/041* (2013.01); *G06F 2203/04102* (2013.01)

(58) Field of Classification Search
CPC ......... G09F 9/301; G02B 1/14; G06F 1/1652; G06F 3/041; G06F 2203/04102; G06F 3/0446; G06F 2203/04103; G06F 1/1643; G06F 2203/04106; G06F 3/046; G06F 3/0354; G06F 3/0412; G06F 3/044; G09G 3/20; H10K 59/12
See application file for complete search history.

(56) References Cited

U.S. PATENT DOCUMENTS

| | | | |
|---|---|---|---|
| 10,976,873 B2 | 4/2021 | Shin et al. | |
| 2015/0268106 A1* | 9/2015 | Otaka | G06F 3/0445 |
| | | | 73/780 |
| 2018/0322848 A1* | 11/2018 | Wu | G09G 5/00 |
| 2019/0171315 A1* | 6/2019 | Park | G06F 3/0445 |

(Continued)

FOREIGN PATENT DOCUMENTS

| | | | | |
|---|---|---|---|---|
| CN | 109256044 A | * | 1/2019 | ............ G09F 9/301 |
| KR | 20160071174 A | * | 6/2016 | |

(Continued)

*Primary Examiner* — Temesghen Ghebretinsae
*Assistant Examiner* — K. Kiyabu
(74) *Attorney, Agent, or Firm* — CANTOR COLBURN LLP

(57) ABSTRACT

An electronic apparatus includes a display module having non-folding areas and a folding area folded along a virtual folding axis, a lower plate which is disposed on a lower portion of the display module and in which lower openings overlapping the folding area are defined, and a digitizer including a first cover layer disposed on a lower portion of the lower plate, first sensing coils, second sensing coils insulated from the first sensing coils, a second cover layer, and a base layer. Each of the first cover layer, the first sensing coils, the second sensing coils, and the second cover layer does not overlap the folding area, and the base layer is exposed by the first cover layer and the second cover layer in the folding area.

28 Claims, 23 Drawing Sheets

(56) References Cited

U.S. PATENT DOCUMENTS

| | | | |
|---|---|---|---|
| 2019/0334114 A1* | 10/2019 | Park | H05K 5/0226 |
| 2020/0209998 A1* | 7/2020 | Shin | G06F 3/044 |
| 2020/0319672 A1* | 10/2020 | Kim | G06F 1/1656 |
| 2022/0147170 A1* | 5/2022 | Park | H10K 59/40 |

FOREIGN PATENT DOCUMENTS

| | | | |
|---|---|---|---|
| KR | 1020200084495 A | 7/2020 | |
| WO | WO-2020204247 A1 * | 10/2020 | C09J 7/38 |

* cited by examiner

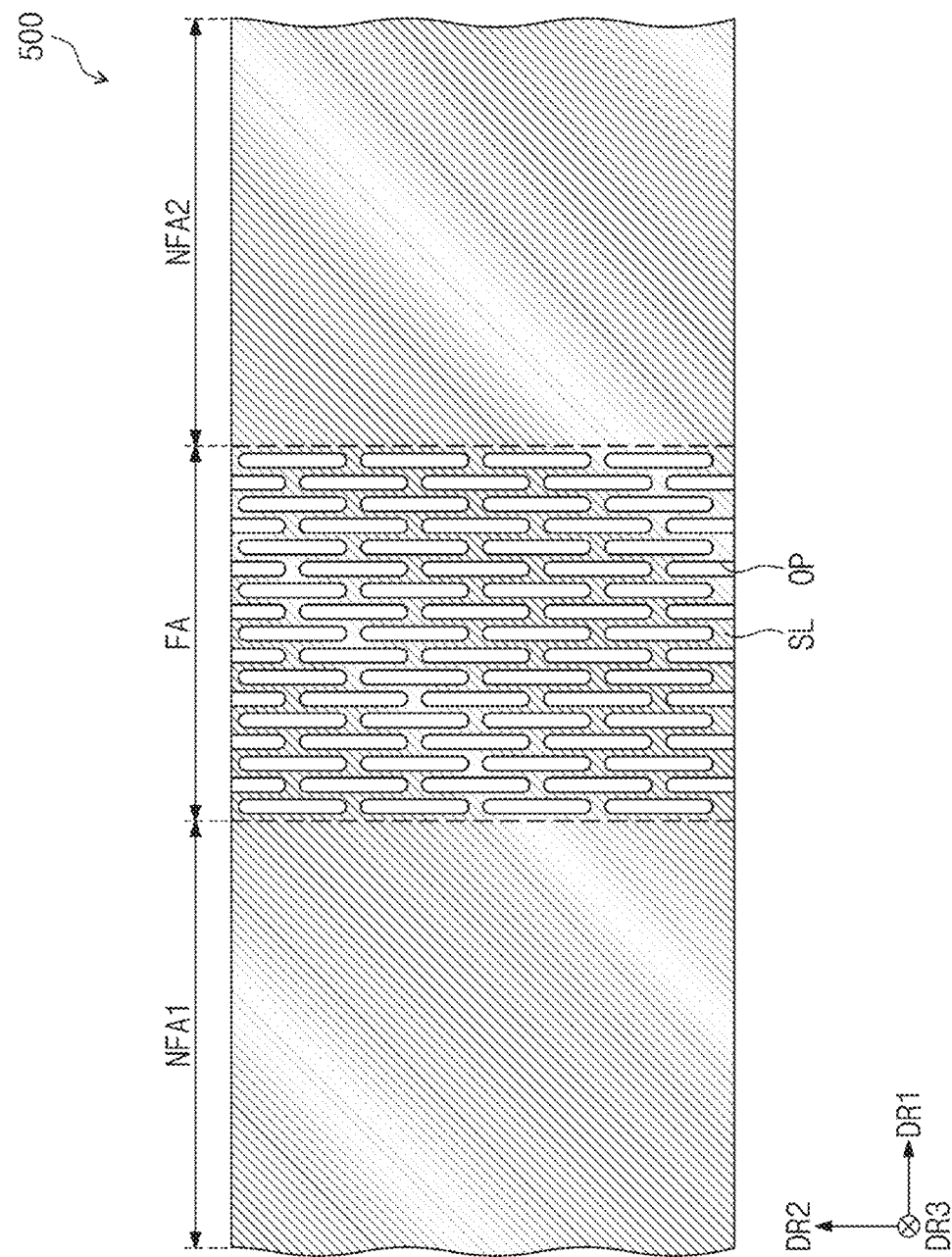

ELECTRONIC APPARATUS

This application claims priority to Korean Patent Application No. 10-2021-0193068, filed on Dec. 30, 2021, and all the benefits accruing therefrom under 35 U.S.C. § 119, the content of which in its entirety is herein incorporated by reference.

BACKGROUND

1. Field

Embodiments of the invention herein relate to an electronic apparatus including a digitizer, and more particularly, to an electronic apparatus with improved reliability.

2. Description of the Related Art

In an information-oriented society, an importance of an electronic apparatus as a visual information delivery medium is increasing. An electronic apparatus is activated by an electrical signal applied thereto. The electronic apparatus includes a digitizer for sensing an input applied from the outside of a display layer which displays an image.

The digitizer of the electronic apparatus may include various sensing coils to be activated by an electrical signal. An area in which the sensing coils are activated reacts to a signal applied from the outside.

SUMMARY

Embodiments of the invention provide an electronic apparatus including a digitizer which senses an external input and whose folding properties are improved.

An embodiment of the invention provides an electronic apparatus including a display module including non-folding areas arranged along a first direction, and a folding area disposed between the non-folding areas and foldable along a virtual folding axis extended along a second direction crossing the first direction, a lower plate which is disposed on a lower portion of the display module and in which lower openings overlapping the folding area are defined, and a digitizer including a first cover layer disposed on a lower portion of the lower plate, first sensing coils, second sensing coils insulated from the first sensing coils, a second cover layer, and a base layer, wherein each of the first cover layer, the first sensing coils, the second sensing coils, and the second cover layer does not overlap a portion of the folding area, and, the base layer is exposed by the first cover layer and the second cover layer in the folding area.

In an embodiment, each of the first cover layer and the second cover layer may include a first portion and a second portion spaced apart from each other with a first width in the folding area, wherein in the first direction, the first width may be smaller than a second width of the folding area.

In an embodiment, in a non-folding state, the first width may be about 0.5 millimeter (mm) to about 4 mm, and the second width may be about 5 mm to about 50 mm.

In an embodiment, the base layer may include a first upper surface facing the first cover layer and a first lower surface opposing the first upper surface, wherein the first sensing coils are disposed on the first upper surface, and the second sensing coils are disposed on the first lower surface, the first cover layer faces the first upper surface and covers the first sensing coils, and the second cover layer faces the first lower surface and covers the second sensing coils.

In an embodiment, the electronic apparatus may further include a first adhesive layer disposed between the first upper surface and the first cover layer and in contact with the first sensing coils and a second adhesive layer disposed between the first lower surface and the second cover layer and in contact with the second sensing coils, wherein the first adhesive layer exposes the first upper surface in the folding area, and the second adhesive layer exposes the first lower surface in the folding area.

In an embodiment, the second cover layer may include a second upper surface facing the first cover layer and a second lower surface opposing the second upper surface, wherein the first sensing coils are disposed on the second upper surface, and the second sensing coils are disposed on the second lower surface, the first cover layer faces the second upper surface and covers the first sensing coils, and the base layer is disposed on the second lower surface and contacts the second sensing coils.

In an embodiment, the electronic apparatus may further include a third adhesive layer disposed between the second upper surface and the first cover layer and in contact with the first sensing coils, wherein the third adhesive layer exposes the base layer in the folding area.

In an embodiment, the first cover layer may include a third upper surface facing the lower plate and a third lower surface opposing the third upper surface, and the second cover layer may include a fourth upper surface facing the first cover layer and a fourth lower surface opposing the fourth upper surface, wherein the first sensing coils are disposed on the third lower surface, and the second sensing coils are disposed on the fourth lower surface, and the base layer is disposed on the fourth lower surface and contacts the second sensing coils.

In an embodiment, the electronic apparatus may further include a fourth adhesive layer disposed between the third lower surface and the fourth upper surface and in contact with the first sensing coils, wherein the fourth adhesive layer exposes the base layer in the folding area.

In an embodiment, the electronic apparatus may further include an adhesive layer disposed between the lower plate and the digitizer, overlapping the non-folding areas, spaced apart from the folding area and exposing the openings.

In an embodiment, the electronic device may further include a panel protection layer disposed between the display module and the lower plate.

In an embodiment, each of the first cover layer and the second cover layer may include polyimide.

In an embodiment the digitizer may include a first digitizer overlapping any one of the non-folding areas and a second digitizer overlapping a remaining one of the non-folding areas and spaced apart from the first digitizer in the first direction in the folding area.

In an embodiment, the base layer may include a synthetic rubber and a cross-linkable composition, wherein the synthetic rubber includes at least one of butadiene rubber, styrene-butadiene rubber, and butyl rubber.

In an embodiment, the thickness of the base layer may be about 10 micrometers ($\mu$m) to about 100 $\mu$m.

In an embodiment, a modulus of the base layer may be about 10 megapascals (MPa) to about 100 MPa.

In an embodiment of the invention, an electronic apparatus includes a display module including non-folding areas arranged along a first direction, and a folding area disposed between the non-folding areas and foldable along a virtual folding axis extended along a second direction crossing the first direction, a lower plate which is disposed on a lower portion of the display module and in which lower openings overlapping the folding area are defined, and a digitizer disposed on a lower portion of the lower plate. The digitizer includes a base layer, a first cover layer including a first portion and a second portion spaced apart from each other to expose a portion of the base layer in the folding area, first sensing coils disposed on a lower portion of the first cover layer, second sensing coils insulated from the first sensing coils, and a second cover layer disposed on a lower portion of the first cover layer, wherein in the first direction, a first width between the first portion and the second portion is smaller than a second width of the folding area.

In an embodiment, the second cover layer may include a third portion overlapping the first portion and a fourth portion spaced apart from the third portion with the first width and exposing a portion of the base layer in the folding area.

In an embodiment, in a non-folding state, the first width may be about 0.5 mm to about 4 mm, and the second width may be about 5 mm to about 50 mm.

In an embodiment, the base layer may include a first upper surface facing the first cover layer and a first lower surface opposing the first upper surface, wherein the first sensing coils are disposed on the first upper surface, and the second sensing coils are disposed on the first lower surface, the first cover layer faces the first upper surface and covers the first sensing coils, and the second cover layer faces the first lower surface and covers the second sensing coils.

In an embodiment, the electronic apparatus may further include a first adhesive layer disposed between the first upper surface and the first cover layer and in contact with the first sensing coils and a second adhesive layer disposed between the first lower surface and the second cover layer and in contact with the second sensing coils, wherein the first adhesive layer exposes the first upper surface in the folding area, and the second adhesive layer exposes the first lower surface in the folding area.

In an embodiment, the second cover layer may include a second upper surface facing the first cover layer and a second lower surface opposing the second upper surface, wherein the first sensing coils are disposed on the second upper surface, and the second sensing coils are disposed on the second lower surface, the first cover layer faces the second upper surface and covers the first sensing coils, and the base layer is disposed on the second lower surface and contacts the second sensing coils.

In an embodiment, the electronic apparatus may further include a third adhesive layer disposed between the second upper surface and the first cover layer and in contact with the first sensing coils, wherein the third adhesive layer exposes the base layer in the folding area.

In an embodiment, the first cover layer may include a third upper surface facing the lower plate and a third lower surface opposing the third upper surface, and the second cover layer comprises a fourth upper surface facing the first cover layer and a fourth lower surface opposing the fourth upper surface, wherein the first sensing coils are disposed on the third lower surface, and the second sensing coils are disposed on the fourth lower surface, and the base layer is disposed on the fourth lower surface and contacts the second sensing coils.

In an embodiment, the electronic apparatus may further include a fourth adhesive layer disposed between the third lower surface and the fourth upper surface and in contact with the first sensing coils, wherein the fourth adhesive layer exposes the base layer in the folding area.

In an embodiment, the digitizer may include a first digitizer overlapping any one of the non-folding areas and a second digitizer overlapping a remaining one of the non-folding areas and spaced apart from the first digitizer in the first direction in the folding area.

In an embodiment, the base layer may include a synthetic rubber and a cross-linkable composition, wherein the synthetic rubber includes at least one of butadiene rubber, styrene-butadiene rubber, and butyl rubber.

In an embodiment, a thickness of the base layer may be about 10 μm to about 100 μm.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain principles of the invention. In the drawings:

FIG. 3B is a plan view of an embodiment of a lower plate in a folded state according to the invention;

DETAILED DESCRIPTION

Figure 1A:
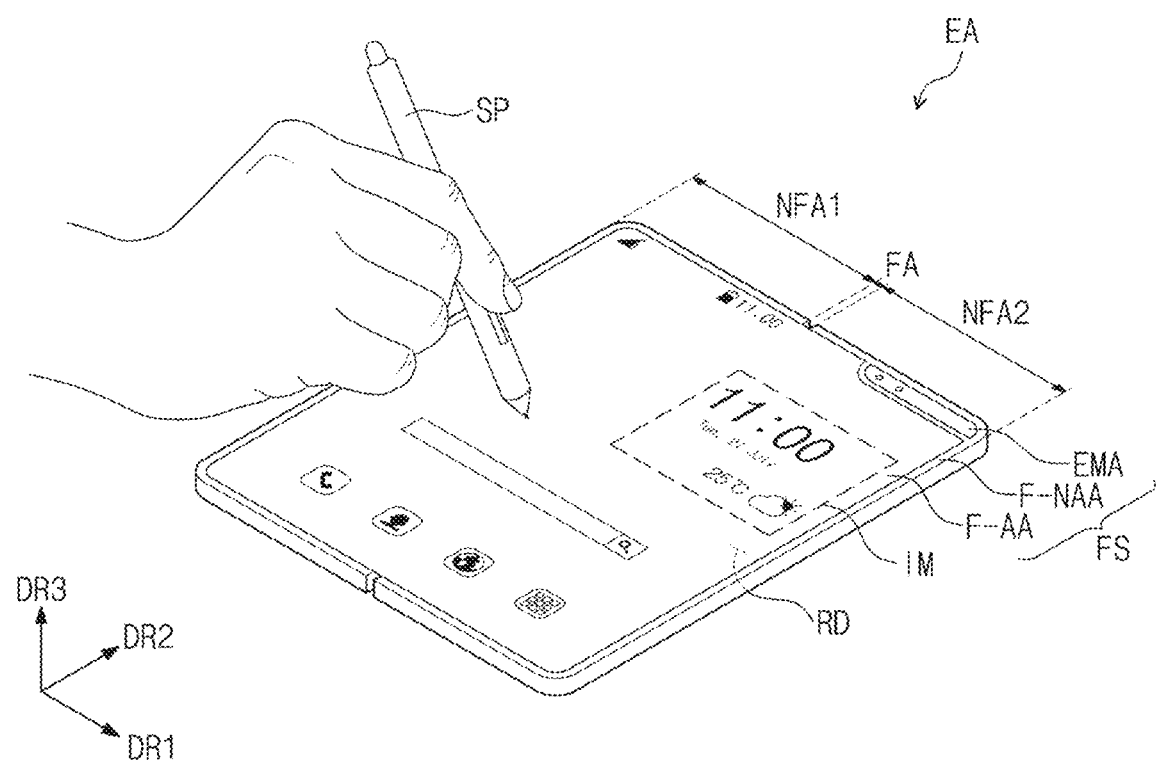
FIG. 1A is a perspective view of an embodiment of an electronic apparatus in an unfolded state according to the invention.

In the disclosure, when an element (or an area, a layer, a portion, etc.) is referred to as being "on," "connected to," or "coupled to" another element, it means that the element may be directly disposed on/connected to/coupled to the other element, or that a third element may be disposed therebetween.

Like reference numerals refer to like elements. Also, in the drawings, the thickness, the ratio, and the dimensions of elements are exaggerated for an effective description of technical contents. The term "and/or" includes any and all combinations of one or more of which associated elements may define.

It will be understood that, although the terms "first," "second," etc. may be used herein to describe various elements, these elements should not be limited by these terms. These terms are only used to distinguish one element from another. A first element may be referred to as a second element, and a second element may also be referred to as a first element in a similar manner without departing the scope of rights of the invention, for example. The terms of a singular form may include plural forms unless the context clearly indicates otherwise.

In addition, terms such as "below," "lower," "above," "upper," or the like are used to describe the relationship of the elements shown in the drawings. The terms are used as a relative concept and are described with reference to the direction indicated in the drawings.

It should be understood that the terms "comprise," or "have" are intended to specify the presence of stated features, integers, steps, operations, elements, components, or combinations thereof in the disclosure, but do not preclude the presence or addition of one or more other features, integers, steps, operations, elements, components, or combinations thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which the invention pertains. It is also to be understood that terms such as terms defined in commonly used dictionaries should be interpreted as having meanings consistent with the meanings in the context of the related art, and should not be interpreted in too ideal a sense or an overly formal sense unless explicitly defined herein.

Hereinafter, embodiments of the invention will be described with reference to the accompanying drawings.

Figure 1B:
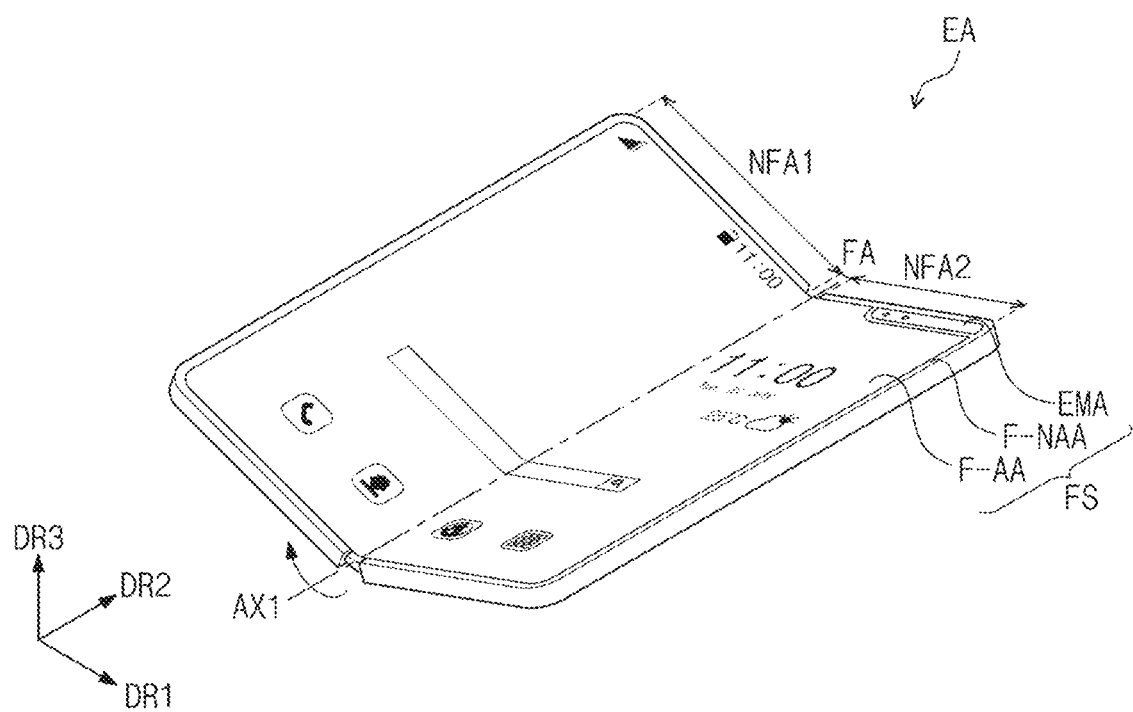
FIG. 1B is a perspective view of an embodiment of an electronic apparatus according to the invention.
Figure 1C:
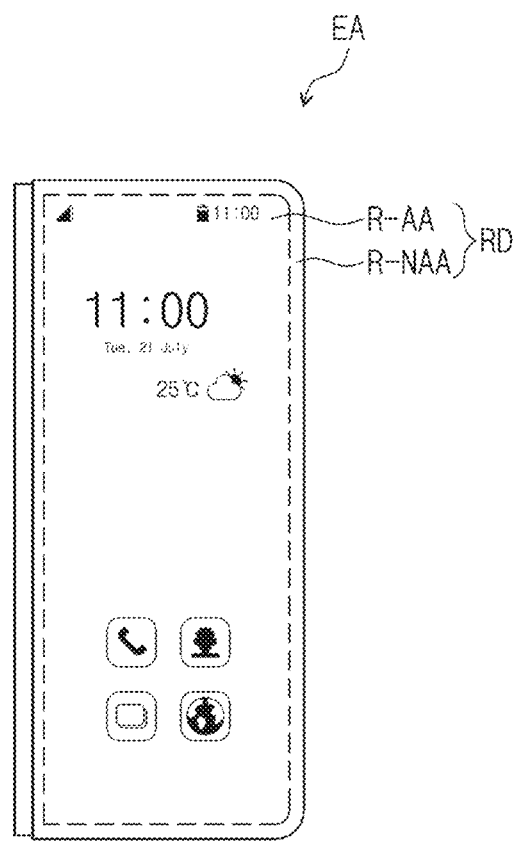
FIG. 1C is a plan view of an embodiment of an electronic apparatus in a folded state according to the invention.
Figure 1C:
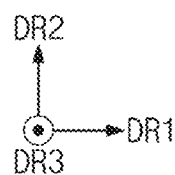
Figure 1D:
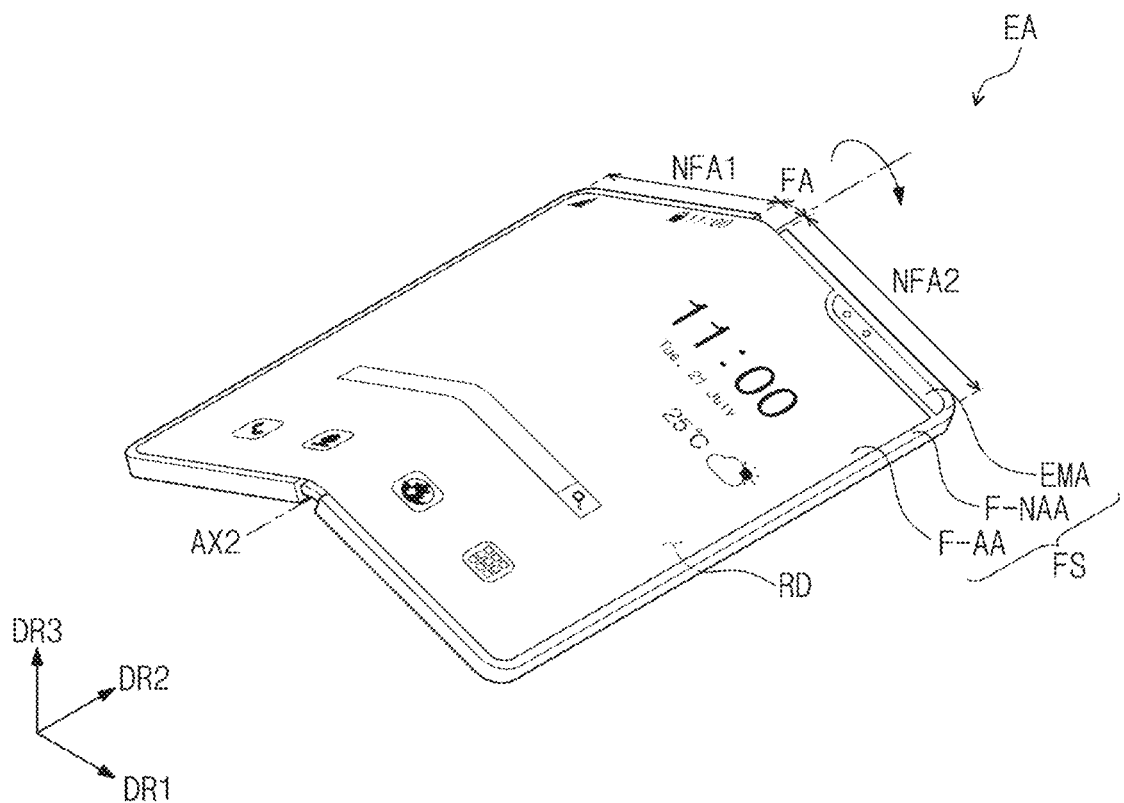
FIG. 1D is a perspective view of an embodiment of an electronic apparatus according to the invention.

FIG. 1A is a perspective view of an embodiment of an electronic apparatus in an unfolded state according to the invention. FIG. 1B is a perspective view of an embodiment of an electronic apparatus according to the invention. FIG. 1C is a plan view of an embodiment of an electronic apparatus in a folded state. FIG. 1D is a perspective view of an embodiment of an electronic apparatus according to the invention.

Referring to FIG. 1A, an electronic apparatus EA may be a device activated according to an electrical signal. The electronic apparatus EA may include various embodiments. In an embodiment, the electronic apparatus EA may include a tablet computer, a laptop, a computer, a smart television, or the like. In the illustrated embodiment, the electronic apparatus EA is illustrated as being a smart phone.

The electronic apparatus EA may display an image IM toward a third direction DR3 on a first display surface FS parallel to each of a first direction DR1 and a second direction DR2. The first display surface FS on which the image IM is displayed may correspond to a front surface of the electronic apparatus EA. The image IM may include both a moving image and a still image. In FIG. 1A, the image IM in an embodiment includes an internet search window and a clock window.

In the invention, a front surface (or an upper surface) and a lower surface (or a rear surface) of each component are defined based on a direction in which the image IM is displayed. The front surface and the rear surface oppose each other in the third direction DR3 and the normal direction of each of the front surface and the rear surface may be parallel to the third direction DR3.

A separation distance between the front surface and the rear surface in the third direction DR3 may correspond to the thickness/height of the electronic apparatus EA in the third direction DR3. Directions indicated by the first to third directions DR1, DR2, and DR3 are a relative concept, and may be converted to different directions.

The electronic apparatus EA may sense an external input applied to the electronic apparatus EA. The external input may include various forms of input provided from the outside of the electronic apparatus EA.

In an embodiment, the external input may include not only a contact by a part of a body of a user, such as a hand, but also an external input applied in close proximity, or adjacent to the electronic apparatus EA at a predetermined distance (e.g., hovering). Also, the external input may have various forms such as force, pressure, temperature, light, or the like.

In FIG. 1A, an external input through a pen SP is illustrated. Although not illustrated, the pen SP may be disposed (e.g., mounted) and demounted inside or outside of the electronic apparatus EA, and the electronic apparatus EA may provide and receive a signal corresponding to the mounting and demounting of the pen SP. However, the invention is not limited thereto, any other instruments other than the pen may be used.

The electronic apparatus EA in the illustrated embodiment may include the first display surface FS and a second display surface RD. The first display surface FS may include a first active area F-AA, a first peripheral area F-NAA, and an electronic module area EMA. The second display surface RD may be defined as a surface opposing at least a portion of the first display surface FS.

The first active area F-AA may be an area activated by an electrical signal. The first active area F-AA is an area in which the image IM is displayed and which may sense an input of the pen SP.

The first peripheral area F-NAA is adjacent to the first active area F-AA. The first peripheral area F-NAA may have a predetermined color. The first peripheral area F-NAA may surround the first active area F-AA. Accordingly, the shape of the first active area F-AA may be substantially defined by the first peripheral area F-NAA. However, this is merely one of embodiments. The first peripheral area F-NAA may be disposed adjacent to only one side of the first active area F-AA, or may be omitted.

In the electronic module area EMA, various electronic modules may be disposed. In an embodiment, an electronic module may include at least one of a camera, a speaker, a light sensing sensor, or a heat sensing sensor, for example. The electronic module area EMA may sense an external object received through the display surfaces FS and RS, or may provide a sound signal such as voice to the outside through the display surfaces FS and RS. An electronic module may include a plurality of components, and is not limited to any particular embodiment.

The electronic module area EMA may be surrounded by the first peripheral area F-NAA. However, the invention is not limited thereto, and the electronic module area EMA may be surrounded by the first active area F-AA and the first peripheral area F-NAA, or the electronic module area EMA may be disposed inside the first active area F-AA, but is not limited to any particular embodiment.

The electronic apparatus EA in the embodiment may include at least one folding area FA, and a plurality present-folding areas NFA1 and NFA2 extended from the folding area FA. The non-folding areas NFA1 and NFA2 may be spaced apart from each other in the first direction DR1 with the folding area FA interposed therebetween.

Referring to FIG. 1B, the electronic apparatus EA includes a virtual first folding axis AX1 extended in the second direction DR2. The first folding axis AX1 may be extended along the second direction DR2 on the first display surface FS.

In the illustrated embodiment, the non-folding areas NFA1 and NFA2 may be extended from the folding area FA with the folding area FA therebetween.

In an embodiment, a first non-folding area NFA1 may be extended along one side of the folding area FA in the first direction DR1, and a second non-folding area NFA2 may be extended along the other side of the folding area FA in the first direction DR1, for example.

The electronic apparatus EA may be folded with reference to the first folding axis AX1 and transformed into an in-folding state in which one area of the first display surface FS overlapping the first non-folding area NFA1 faces an opposite area thereof overlapping the second non-folding area NFA2.

Referring to FIG. 1C, in the in-folding state, the second display surface RD of the electronic apparatus EA in an embodiment may be visible to a user. At this time, the second display surface RD may include a second active area R-AA for displaying an image. The second active area R-AA may be an area activated by an electrical signal. The second active area R-AA is an area on which an image is displayed and which may sense an external input of various forms.

A second peripheral area R-NAA is adjacent to the second active area R-AA. The second peripheral area R-NAA may have a predetermined color. The second peripheral area R-NAA may surround the second active area R-AA. Also, although not illustrated, the second display surface RD may also further include an electronic module area in which an electronic module including various components is included, and is not limited to any particular embodiment.

Referring to FIG. 1D, the electronic apparatus EA in an embodiment includes a virtual second folding axis AX2 extended in the second direction DR2. The second folding axis AX2 may be extended along the second direction DR2 on the second display surface RD.

The electronic apparatus EA may be folded with reference to the second folding axis AX2 and transformed into an out-folding state in which one area of the second display surface RD overlapping the first non-folding area NFA1 faces an opposite area thereof overlapping the second non-folding area NFA2.

However, the invention is not limited thereto, and the electronic apparatus EA in an embodiment may be folded with reference to a plurality of folding axes such that a portion of each of the first display surface FS and the second display surface RD may be folded to face each other, and the number of folding axes and the number of non-folding areas accordingly are not limited to any particular embodiment. Further, in other embodiments, a virtual folding axis of the electronic apparatus EA may extend in a direction different from the second direction DR2.

Figure 2:
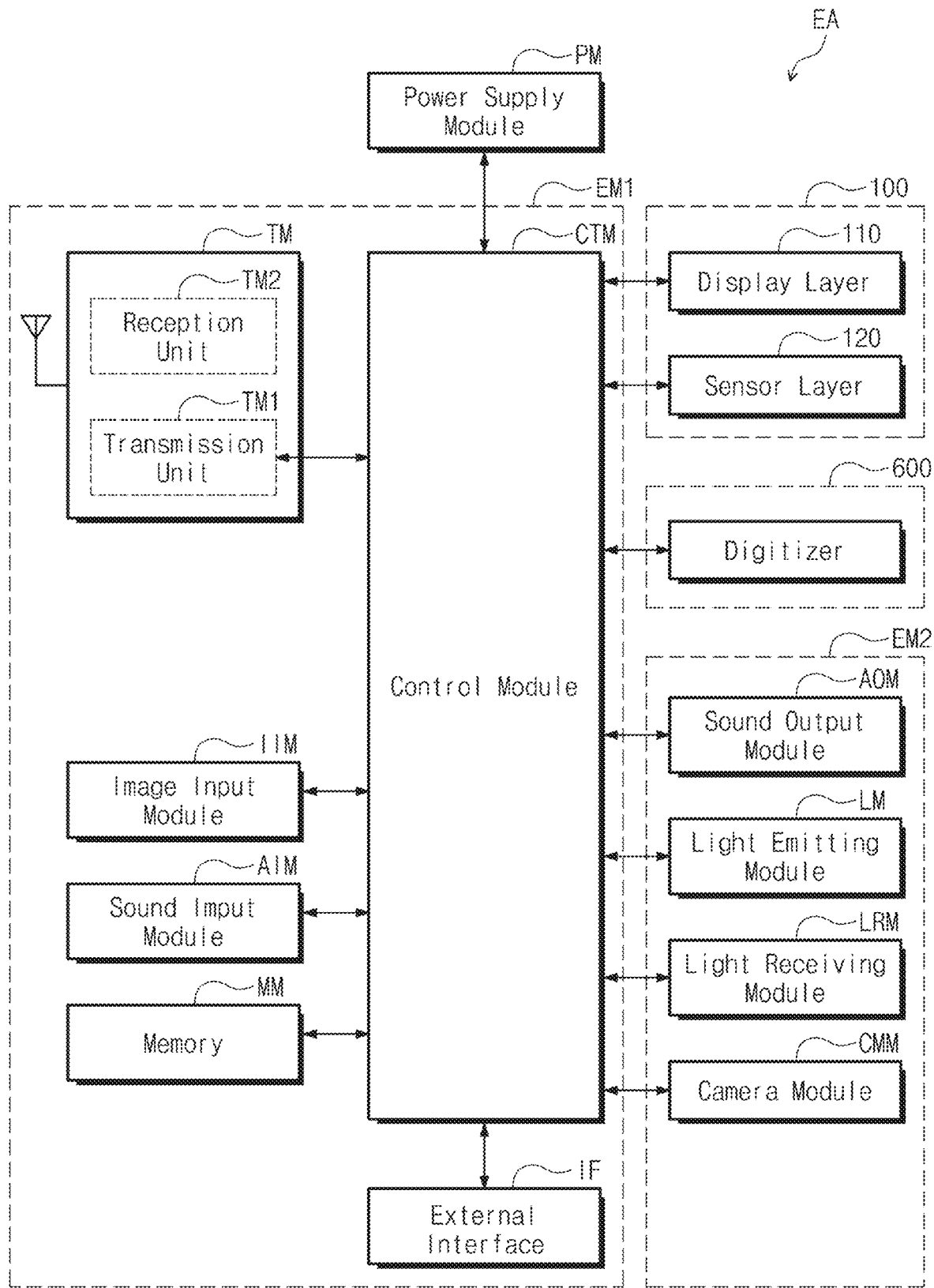
FIG. 2 is a block diagram of an embodiment of an electronic apparatus according to the invention.

FIG. 2 is a block diagram of an embodiment of an electronic apparatus according to the invention.

Referring to FIG. 2, the electronic apparatus EA according to the invention may include a display module 100, a power supply module PM, a first electronic module EM1, and a second electronic module EM2. The display module 100, a digitizer 600, the power supply module PM, the first electronic module EM1, and the second electronic module EM2 may be electrically connected.

The display module 100 may include a display layer 110 and a sensor layer 120. The display layer 110 may be a component which substantially generates an image. The image generated by the display layer 110 is visually recognized by a user from the outside through the first display surface FS (refer to FIG. 1A).

The first electronic module EM1 and the second electronic module EM2 include various functional modules for operating the electronic apparatus EA. The first electronic module EM1 may be directly disposed (e.g., mounted) on a mother board electrically connected to the display module 100, or may be disposed (e.g., mounted) on a separate substrate and electrically connected to the mother board through a connector (not shown) or the like.

The first electronic module EM1 may include a control module CTM, a wireless communication module TM, an image input module IIM, a sound input module AIM, a memory MM, and an external interface IF. Some of the modules may not be disposed (e.g., mounted) on the mother board, but instead, may be electrically connected to the mother board through a flexible printed circuit board.

The control module CTM controls the overall operation of the electronic apparatus EA. The control module CTM may be a microprocessor. In an embodiment, the control module CTM either activates or deactivates the display module 100, for example. The control module CTM may control other modules, such as the image input module IIM or the sound input module AIM, on the basis of a touch signal received from the display module 100.

The wireless communication module TM may transmit/receive wireless signals with other terminals using Bluetooth or a Wi-Fi line. The wireless communication module TM may transmit/receive voice signals using a general communication line. The wireless communication module TM includes transmittance unit TM1 for modulating and transmitting a signal to be transmitted, and a reception unit TM2 for demodulating a received signal.

The image input module IIM processes an image signal and converts the processed image signal into image data displayable on the display module 100. The sound input module AIM receives an external sound signal through a microphone in a recording mode, a voice recognition mode, or the like, and converts the received external sound signal into electrical voice data.

The external interface IF serves as an interface to be connected to an external charger, a wired/wireless data port, a card socket (e.g., a memory card, a subscriber identity module/user identity module ("SIM/UIM") card), or the like.

The second electronic module EM2 may include a sound output module AOM, a light-emitting module LM, a light-receiving module LRM, a camera module CMM, or the like.

The above components may be directly disposed (e.g., mounted) on a mother board, may be disposed (e.g., mounted) on a separate substrate to be electrically connected to the display module 100 through a connector (not shown) or the like, or may be electrically connected to the first electronic module EM1.

The sound output module AOM converts sound data received from the wireless communication module TM or sound data stored in the memory MM and outputs the converted sound data to the outside.

The light-emitting module LM generates and outputs light. The light-emitting module LM may output an infrared ray. In an embodiment, the light-emitting module LM may include a light-emitting diode ("LED") element, for example. In an embodiment, the light-receiving module LRM may sense an infrared ray, for example. The light-receiving module LRM may be activated when an infrared ray of a predetermined level or higher is sensed. The light-receiving module LRM may include a complementary metal oxide semiconductor ("CMOS") sensor. After generated infrared light is output from the light-emitting module LM, the infrared light is reflected by an external object (such as a finger or face of a user) and the reflected infrared light may be incident on the light-receiving module LRM. The camera module CMM captures an external image.

The digitizer 600 may include a plurality of sensing coils, a base layer, and cover layers. The digitizer 600 may sense an external input by an electro-magnetic resonance ("EMR") method. By the EMR method, a magnetic field is generated in a resonance circuit formed inside the pen SP (refer to FIG. 1A), and then the vibrating magnetic field induces a signal in the plurality of sensing coils included in the digitizer 600, and through the signal induced in the sensing coils, the position of the pen SP may be detected. The digitizer 600 will be described later.

Figure 3A:
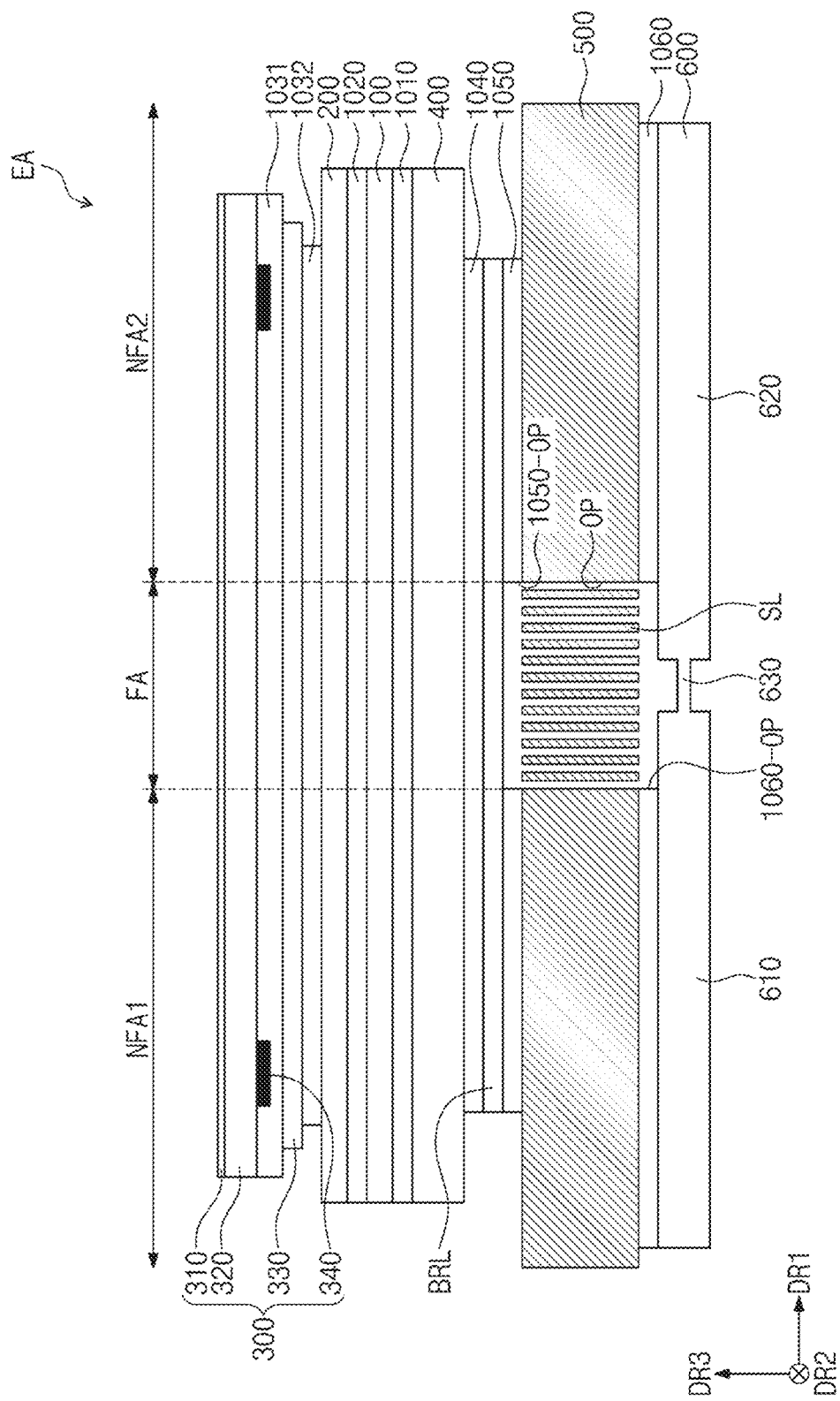
FIG. 3A is a cross-sectional view of an embodiment of an electronic apparatus according to the invention.
Figure 3C:
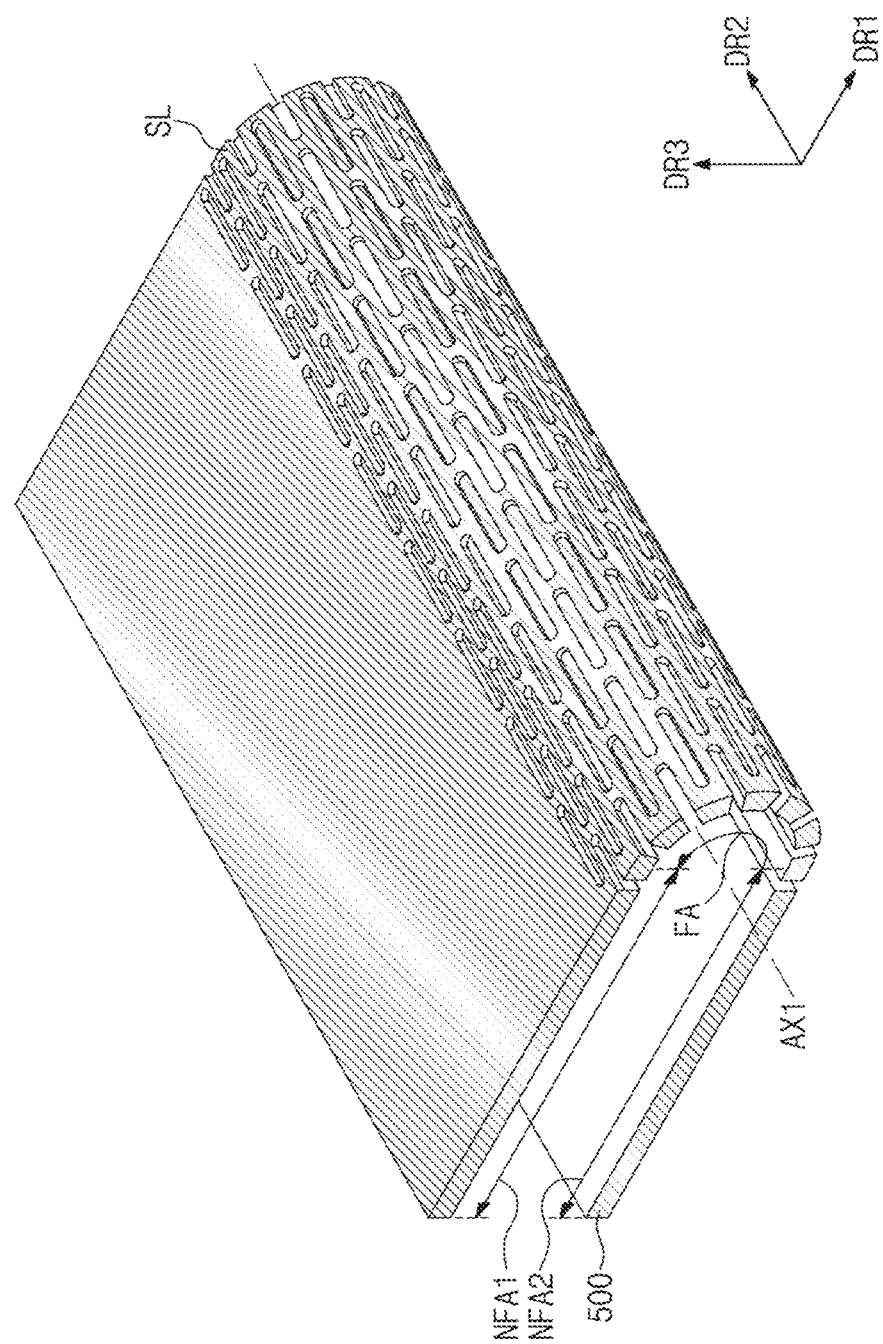
FIG. 3C is a perspective view of an embodiment of a lower plate in a folded state according to the invention.
Figure 4A:
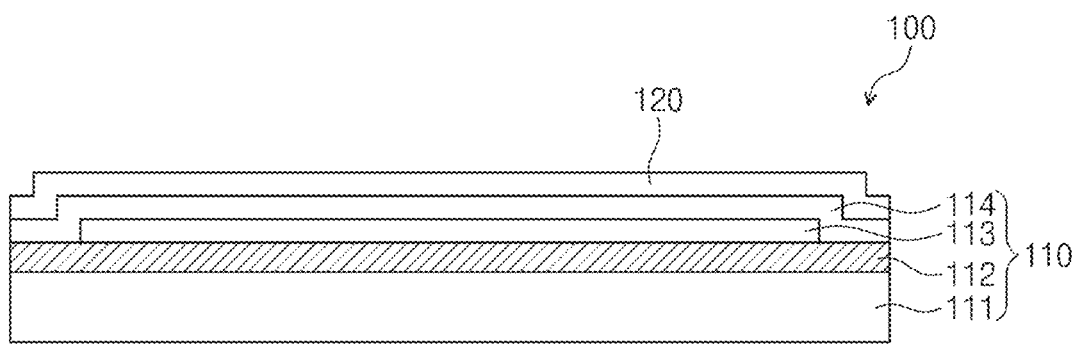
FIG. 4A is a cross-sectional view of an embodiment of a display layer according to the invention.
Figure 4A:
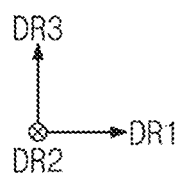
Figure 4B:
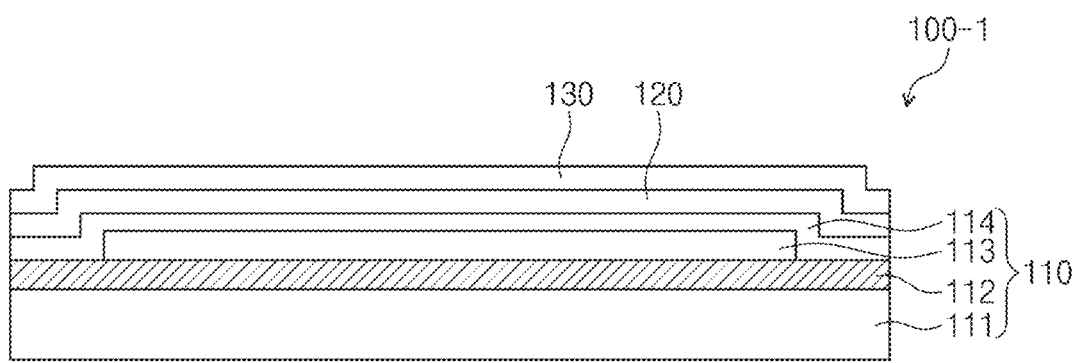
FIG. 4B is a cross-sectional view of an embodiment of a display layer according to the invention.
Figure 4B:
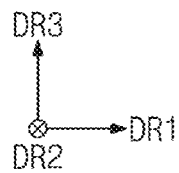

FIG. 3A is a cross-sectional view of an embodiment of an electronic apparatus according to the invention. FIG. 3B is a plan view of an embodiment of a lower plate in a folded state according to the invention. FIG. 3C is a perspective view of an embodiment of a lower plate in a folded state according to the invention. FIG. 4A is a cross-sectional view of an embodiment of a display layer according to the invention. FIG. 4B is a cross-sectional view of an embodiment of a display layer according to the invention.

Referring to FIG. 3A, the electronic apparatus EA in an embodiment may include a window module 300, an optical film 200, the display module 100, a panel protection layer 400, a lower plate 500, and the digitizer 600. In addition, the electronic apparatus EA may include adhesive layers for bonding each of the components.

The adhesive layers to be described below may be a transparent adhesive layer including any one among a pressure sensitive adhesive film ("PSA"), an optically clear adhesive film ("OCA"), and an optically clear resin ("OCR"). In an alternative embodiment, at least one adhesive layer of the adhesive layers may be omitted.

The window module 300 may include a glass substrate 330, a window protection layer 320 disposed on the glass substrate 330, and a light-blocking pattern 340 disposed on a lower surface of the window protection layer 320. In the illustrated embodiment, the window protection layer 320 may include a plastic film. The window protection layer 320 and the glass substrate 330 may be coupled by an adhesive layer 1031.

The thickness of the glass substrate 330 may be about 15 µm to about 45 µm. The glass substrate 330 may be chemically reinforced glass. The glass substrate 330 may minimize the occurrence of wrinkles even when folding and unfolding are repeated.

The window protection layer 320 may be disposed on the glass substrate 330. The window protection layer 320 may include at least one of polyimide, polycarbonate, poly amide, triacetylcellulose, polymethylmethacrylate, or polyethylene terephthalate.

In the illustrated embodiment, the window module 300 may further include a hard coating layer 310. The hard coating layer 310 may be disposed on the window protection layer 320 to be disposed on the outermost layer of the window module 300. The hard coating layer 310 is a functional layer for improving the use properties of the electronic apparatus EA, and may be provided coated on the window protection layer 320. In an embodiment, due to the hard coating layer 310, fingerprint prevention properties, contamination prevention properties, reflection prevention properties, scratch prevention properties, or the like may be improved, for example.

The light-blocking pattern 340 may overlap the first peripheral area F-NAA illustrated in FIG. 1A. In the illustrated embodiment, the light-blocking pattern 340 may be disposed on one surface of the window protection layer 320 facing the glass substrate 330.

The light-blocking pattern 340 is a colored light-blocking film, and may be formed in a coating manner, for example. The light-blocking pattern 340 may include a base material and a dye or a pigment mixed in the base material. Therefore, a user may recognize the first peripheral area F-NAA of the electronic apparatus EA due to a predetermined color of the light-blocking pattern 340.

The light-blocking pattern 340 illustrated in FIG. 3 is illustrated as being disposed on the inner side of the window protection layer 320 at a predetermined distance from an end of the window protection layer 320, but is not limited thereto, and the light-blocking pattern 340 may be disposed on a lower portion of the window protection layer 320 to be aligned with the end of the window protection layer 320, and is not limited to any particular embodiment. In addition, FIG. 3 illustrates the light-blocking pattern 340 disposed on a lower surface of the window protection layer 320. Without being limited thereto, the light-blocking pattern 340 may be disposed on an upper surface of the window protection layer 320, or either an upper surface or a lower surface of the glass substrate 330.

The window module 300 and the optical film 200 may be coupled by an adhesive layer 1032.

The optical film 200 may be disposed between the window module 300 and the display module 100. The optical film 200 may lower an external light reflectance rate. The optical film 200 may include a phase retarder and/or a polarizer. The optical film 200 may include at least a polarizing film.

The display module 100 may be disposed between the optical film 200 and the panel protection layer 400. The display module 100 may be a component which generates an image, and senses an input applied from the outside. In an embodiment, the display module 100 may include the display layer 110 and the sensor layer 120 described with reference to FIG. 2, for example. The display layer 110 may be a component which substantially generates an image. The display layer 110 may be any one of an organic light-emitting display panel, a quantum-dot display panel, and an inorganic light-emitting display panel, but is not particularly limited thereto.

The optical film 200 and the display module 100 may be coupled by an adhesive layer 1020.

Referring to FIG. 4A, the display layer 110 in an embodiment may include a base layer 111, a circuit element layer 112, and an encapsulation layer 114.

The base layer 111 may include a synthetic resin film. A synthetic resin layer may include a thermosetting resin. The base layer 111 may have a multi-layered structure. In an embodiment, the base layer 111 may have a three-layered structure of a synthetic resin layer, an adhesive layer, and a synthetic resin layer, for example. Particularly, the synthetic resin layer may be a polyimide-based resin layer, and the material thereof is not particularly limited. The synthetic resin layer may include at least at least one of an acrylic resin, a methacrylic resin, polyisoprene, a vinyl-based resin, an epoxy-based resin, a urethane-based resin, a cellulose-based resin, a siloxane-based resin, a polyamide-based resin, or a perylene-based resin. In addition, the base layer 111 may include a glass substrate, an organic/inorganic composite material substrate, or the like.

The circuit element layer 112 may be disposed on the base layer 111. The circuit element layer 112 may include an insulation layer, a semiconductor pattern, a conductive pattern, a signal line, or the like. The insulation layer, a semiconductor layer, and a conductive layer are formed above the base layer 111 by coating, deposition, or the like, and thereafter, the insulation layer, the semiconductor layer, and the conductive layer may be selectively patterned through performing a photolithography process a plurality of times. Thereafter, the semiconductor pattern, the conductive pattern, and the signal line, all included in the circuit element layer 112, may be formed.

A display element layer 113 may be disposed on the circuit element layer 112. The display element layer 113 may include a light-emitting element. In an embodiment, the display element layer 113 may include an organic light-emitting material, a quantum dot, a quantum rod, or a micro LED, for example.

The encapsulation layer 114 may be disposed on the display element layer 113. The encapsulation layer 114 may include an inorganic layer, an organic layer, and an inorganic layer sequentially stacked, but layers constituting the encapsulation layer 114 are not limited thereto.

The inorganic layers may protect the display element layer 113 from moisture and oxygen, and the organic layer may protect the display element layer 113 from foreign substances such as dust particles. The inorganic layers may include a silicon nitride layer, a silicon oxynitride layer, a silicon oxide layer, a titanium oxide layer, an aluminum oxide layer, or the like. The organic layer may include an acrylic organic layer, but the invention is not limited thereto.

Referring to FIG. 4B, when compared with the display module 100 described with reference to FIG. 4A above, a display module 100-1 may further include an optical film 130 disposed on the sensor layer 120. In the electronic apparatus EA (refer to FIG. 1A) including the optical film 130 inside the display module 100-1, the optical film 200 and the adhesive layer 1020 described with reference to FIG. 3A may be omitted.

The sensor layer 120 may be disposed on the display layer 110. The sensor layer 120 may sense an external input applied from the outside. The external input may be a user input. The user input includes various forms of external inputs such as a part of a body of a user, light, heat, a pen, and pressure.

The sensor layer 120 may be formed on the display layer 110 through a continuous process. In this case, the sensor layer 120 may be expressed as being 'directly disposed' on the display layer 110. Being directly disposed may mean that a third component is not disposed between the sensor layer 120 and the display layer 110. That is, a separate adhesive member may not be disposed between the sensor layer 120 and the display layer 110.

However, the invention is not limited thereto, and the sensor layer 120 may be provided as a separate module and be coupled to the display layer 110 through an adhesive member. The adhesive member may include a typical adhesive or pressure-sensitive adhesive.

Referring back to FIG. 3A, the panel protection layer 400 may be disposed on a lower side of the display module 100. The panel protection layer 400 may be disposed on a lower portion of the display module 100 to protect the display module 100. The panel protection layer 400 may include a flexible plastic material. In an embodiment, the panel protection layer 400 may include polyethylene terephthalate, for example.

The panel protection layer 400 is illustrated as overlapping the folding area FA and the non-folding areas NFA1 and NFA2, but is not limited thereto, and the panel protection layer 400 may not overlap the folding area FA, and include two protective layers respectively overlapping the non-folding areas NFA1 and NFA2.

The display module 100 and the panel protection layer 400 may be coupled by an adhesive layer 1010.

A barrier layer BRL may be disposed on a lower portion of the panel protection layer 400. The barrier layer BRL may increase resistance against compressive force caused by external pressing. Therefore, the barrier layer BRL may serve to prevent the deformation of the display module 100.

The barrier layer BRL may include a flexible plastic material such as polyimide or polyethylene terephthalate. In addition, the barrier layer BRL may be a colored film with low light transmittance. The barrier layer BRL may absorb light incident from the outside. In an embodiment, the barrier layer BRL may a black synthetic resin film, for example. When the electronic apparatus EA is viewed from an upper side of the window protection layer 320, elements disposed on a lower side of the barrier layer BRL may not be visually recognized by a user. The thickness of the barrier layer BRL may be about 25 µm to about 100 µm. In the electronic apparatus EA in an embodiment, the barrier layer BRL may be omitted.

The panel protection layer 400 and the barrier layer BRL may be coupled by an adhesive layer 1040.

The lower plate 500 is disposed on a lower portion of the display module 100. The lower plate 500 supports components disposed on an upper side of the lower plate 500, and maintains the unfolded state and folded state of the display module 100. In addition, the heat dissipation performance of the electronic apparatus EA may be improved due to the lower plate 500.

Referring to FIG. 3B and FIG. 3C, in an area of the lower plate 500 overlapping the folding area FA, a plurality of openings OP may be defined. The openings OP may be formed penetrating from an upper surface of the lower plate 500 to a rear surface thereof. In the folding area FA, portions between the openings OP may have a slit SL structure. The slit structure may have a shape connected to each other like a mesh.

According to the invention, during in-folding based on the first folding axis AX1 (refer to FIG. 1B), areas of the openings OP between the slits SL may increase or decrease depending on the folding direction, and during non-folding, the openings OP may have the original shapes thereof back.

Therefore, since the openings OP are defined in the lower plate 500 in an area overlapping the folding area FA, the electronic apparatus EA may be more easily deformed when folded.

The lower plate 500 may include at least one of stainless steel, titanium, and reinforced fiber composite material. The reinforced fiber composite material may be carbon fiber reinforced plastic ("CFRP") or glass fiber reinforced plastic ("GFRP").

The barrier layer BRL and the lower plate 500 may be coupled by an adhesive layer 1050. The adhesive layer 1050 in an embodiment may include a first portion overlapping the first non-folding area NFA1 and a second portion overlapping the second non-folding area NFA2. The first portion and the second portion may not overlap the folding area FA, and may be disposed having a separation space 1050-OP along the first direction DR1. Therefore, the adhesive layer 1050 may not overlap the openings OP of the lower plate 500. Accordingly, when the lower plate 500 is folded, the slit SL may be easily deformed without the interference of the adhesive layer 1050.

The digitizer 600 may be disposed on a lower portion of the lower plate 500. The digitizer 600 may include a first digitizer 610, a second digitizer 620, and a connection part 630 which extends between the first digitizer 610 and the second digitizer 620. In the invention, the connection part 630 may be defined as one portion of a base layer BS (refer to FIG. 8) exposed by components of the digitizer 600. Therefore, the thickness of the connection part 630 may be less than the thickness of the first digitizer 610 and the thickness of the second digitizer 620.

According to the invention, the first digitizer 610 and second digitizer 620 may be separately disposed in the first non-folding area NFA1 and the second non-folding area NFA2 and may individually sense an input of the pen SP (refer to FIG. 1A). In addition, in some areas of the folding area FA, the input of the pen SP may be sensed.

The first digitizer 610 may overlap the first non-folding area NFA1 and a portion of the folding area FA adjacent to the first non-folding area NFA1. The second digitizer 620 may overlap the second non-folding area NFA2 and a portion of the folding area FA adjacent to the second non-folding area NFA2. The first digitizer 610 and the second digitizer 620 may be spaced apart from each other in the folding area FA.

The connection part 630 may be disposed between the first digitizer 610 and the second digitizer 620 in the folding area FA.

The digitizer 600 according to the invention includes the first digitizer 610, the second digitizer 620, and the connection part 630 which have different thicknesses and which are individually driven in the non-folding areas NFA1 and NFA2 and the folding area FA, and thus, may reduce stress applied to the digitizer 600 in the folding area FA. Accordingly, cracking of wirings disposed inside the digitizer 600 may be reduced. The digitizer 600 will be described in detail later.

The lower plate 500 and the digitizer 600 may be coupled by an adhesive layer 1060. The adhesive layer 1060 in an embodiment may include a third portion overlapping the first non-folding area NFA1 and a fourth portion overlapping the second non-folding area NFA2. The third portion and the fourth portion may not overlap the folding area FA by an opening 1060-OP defined in the adhesive layer 1060, and may be spaced apart along the first direction DR1.

The lower plate 500 and the first digitizer 610 may be coupled by the third portion, and the lower plate 500 and the second digitizer 620 may be coupled by the third portion.

Since the adhesive layer 1060 does not overlap the folding area FA, when the digitizer 600 is folded, the digitizer 600 may be easily deformed without the interference of the adhesive layer 1060.

The electronic apparatus EA in an embodiment may further include a heat dissipation sheet and a gap tape disposed on a lower portion of the digitizer 600. The heat dissipation sheet may be a thermally conductive sheet having high thermal conductivity. The heat dissipation sheet may include graphite. The gap tape may compensate a step formed due to the attachment of the heat dissipation sheet. The gap tape may surround at least a portion of the heat dissipation sheet along the edge of the heat dissipation sheet, and may include the same material as that of the adhesive layers.

Figure 5A:
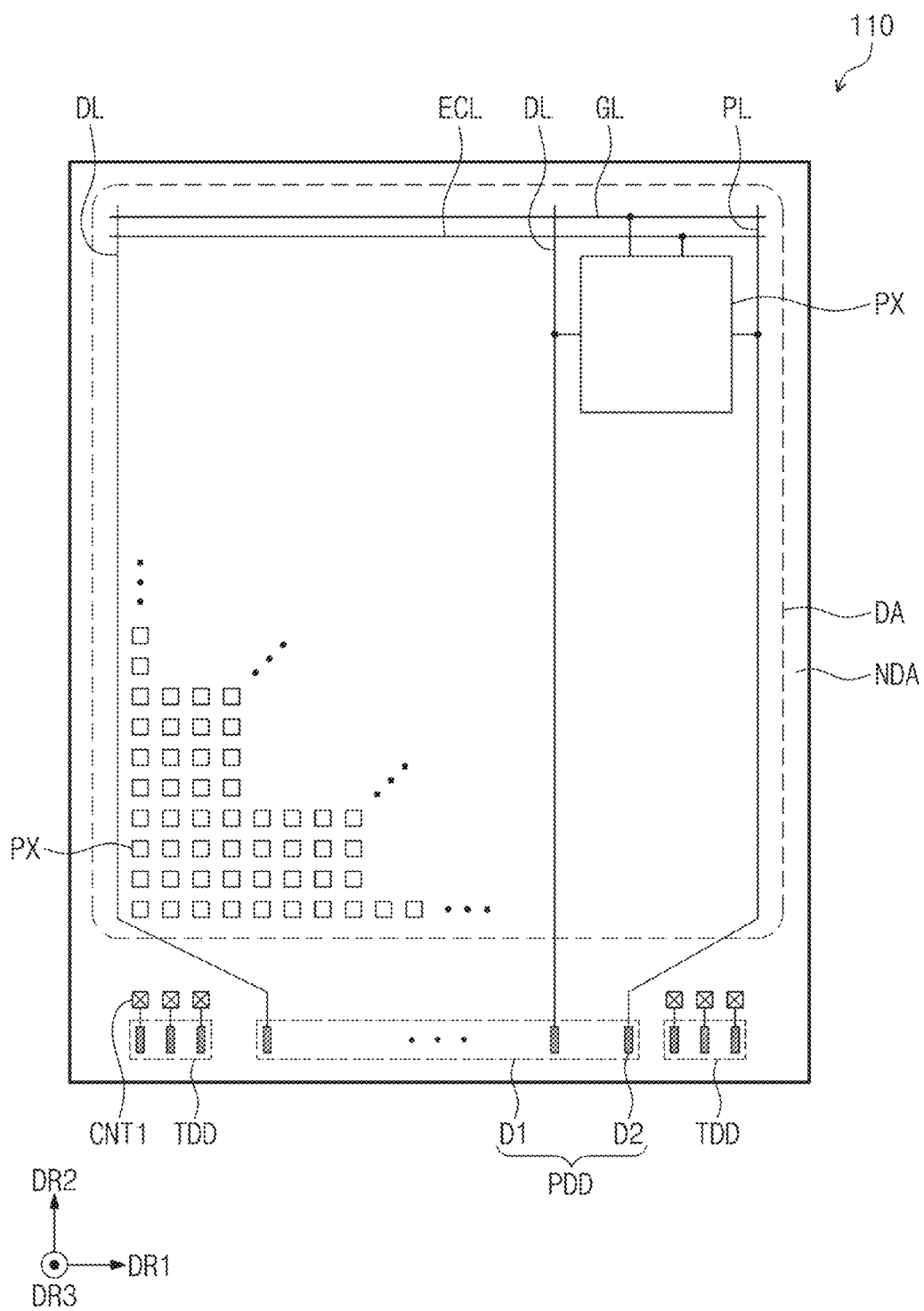
FIG. 5A is a plan view of an embodiment of a display layer according to the invention.
Figure 5B:
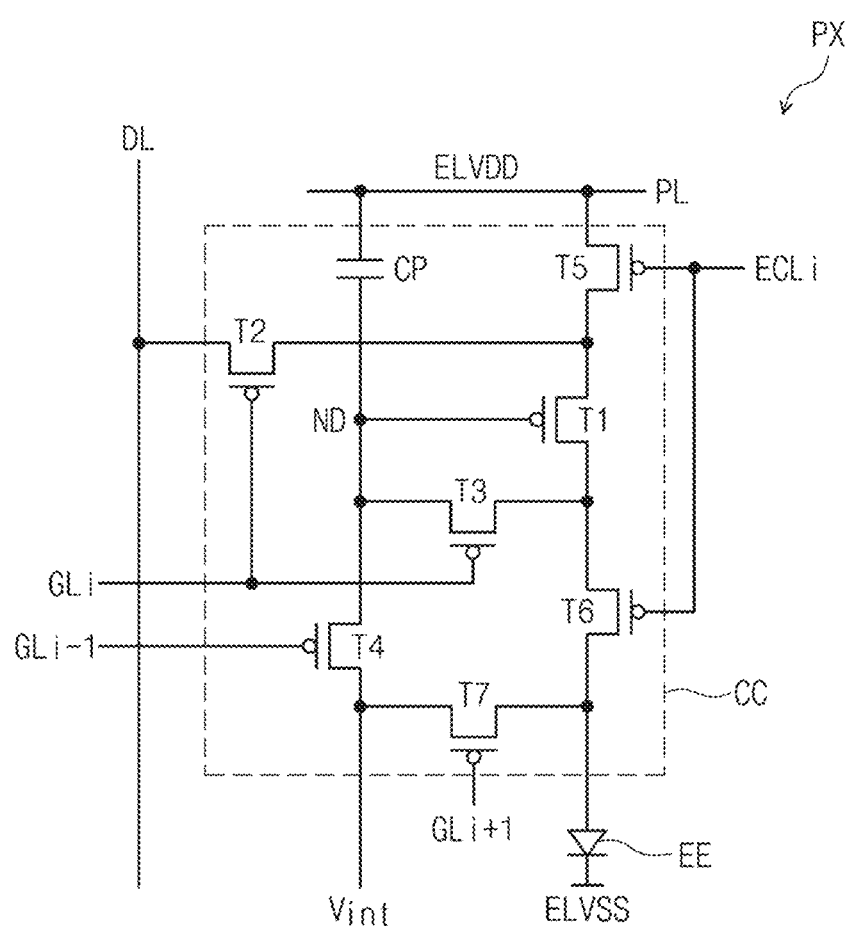
FIG. 5B is an equivalent circuit diagram of an embodiment of a pixel according to the invention.
Figure 6:
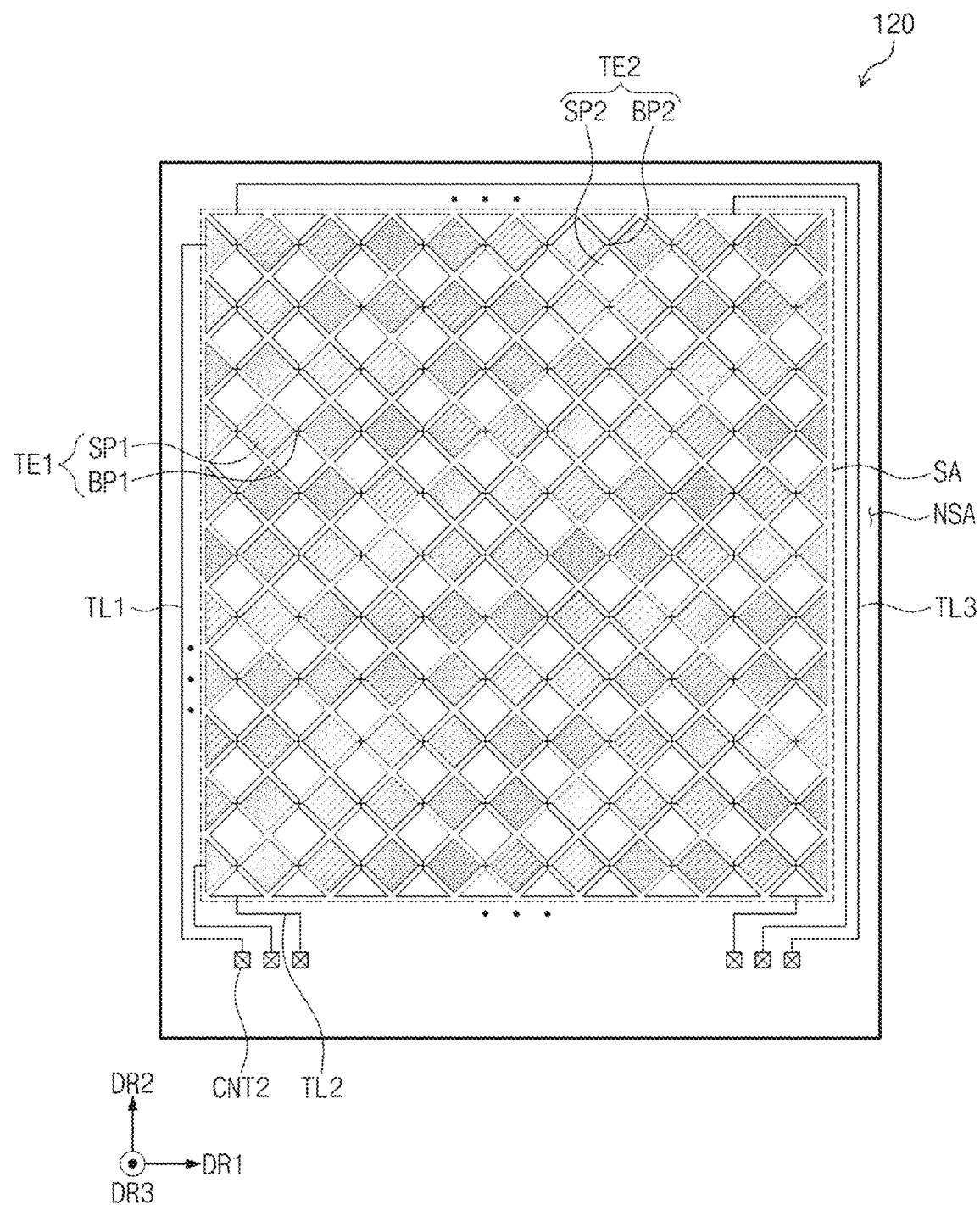
FIG. 6 is a plan view of an embodiment of a sensor layer according to the invention.

FIG. 5A is a plan view of an embodiment of a display layer according to the invention. FIG. 5B is an equivalent circuit diagram of an embodiment of a pixel according to the invention. FIG. 6 is a plan view of an embodiment of a sensor layer according to the invention.

Referring to FIG. 5A, a display layer 110 may include a plurality of pixels PX, a plurality of signal lines GL, DL, PL, and ECL, and a plurality of display pads PDD. The display layer 110 may correspond to the display layer 110 described with reference to FIG. 4A and FIG. 4B.

A display area DA of the display layer 110 may be an area in which an image IM is displayed, and a non-display area NDA may be an area in which a driving circuit, a driving line, or the like are disposed. The display area DA may overlap at least a portion of the active areas F-AA and R-AA (refer to FIGS. 1A and 1C) of the electronic apparatus EA (refer to FIG. 1A). In addition, the non-display area NDA may overlap the peripheral areas F-NAA and R-NAA (refer to FIGS. 1A and 1C) of the electronic apparatus EA.

The plurality of signal lines GL, DL, PL, and ECL are connected to the pixels PX and transmit electrical signals to the pixels PX. Among signal lines included in the display layer 110, a scan line GL, a data line DL, a power supply line PL, and a light emission control line ELC are illustrated. However, this is merely one of embodiments. The signal lines GL, DL, PL, and ECL may further include an initialization voltage line, and are not limited to any particular embodiment.

The pixels PX may be spaced apart from each other along the first direction DR1 and the second direction DR2 and may have a matrix shape in a plan view. However, the invention is not limited thereto, and the pixels PX may be arranged in various other shapes.

Referring to FIG. 5B, an enlarged signal circuit diagram of one pixel PX among the plurality of pixels is illustrated. FIG. 5B illustrates the pixel PX connected to an i-th scan line GLi and an i-th light emission control line ECLi. Here, i is a natural number.

The pixel PX may include a light-emitting element EE and a pixel circuit CC. The pixel circuit CC may include a plurality of transistors T1 to T7 and a capacitor CP. The plurality of transistors T1 to T7 may be formed through a low temperature polycrystalline silicon ("LTPS") process or a low temperature polycrystalline oxide ("LTPO") process.

The pixel circuit CC controls the amount of current flowing through the light-emitting element EE in correspondence to a data signal. The light-emitting element EE may emit light to a predetermined luminance in correspondence to an amount of current provided from the pixel circuit CC.

To this end, the level of a first power ELVDD may be set to be higher than the level of a second power ELVSS. The light-emitting element EE may include an organic light-emitting element or a quantum dot light-emitting element.

Each of the plurality of transistors T1 to T7 may include an input electrode (or a source electrode), an output electrode (or a drain electrode), and a control electrode (or a gate electrode). In the invention, any one of the input electrode and the output electrode may be also referred to as a first electrode, and the other one thereof may be also referred to as a second electrode for convenience.

The first electrode of a first transistor T1 is connected to the first power ELVDD via a fifth transistor T5, and the second electrode of the first transistor T1 is connected to an anode electrode of the light-emitting element EE via a sixth transistor T6. The first transistor T1 may be also referred to as a driving transistor in the invention.

The first transistor T1 controls the amount of current flowing through the light-emitting element EE in correspondence to a voltage applied to the control electrode of the first transistor T1.

A second transistor T2 is connected between a data line DL and the first electrode of the first transistor T1. In addition, the control electrode of the second transistor T2 is connected to the i-th scan line GLi. The second transistor T2 is turned on when an i-th scan signal is provided to the i-th scan line GLi, and electrically connects the data line DL and the first electrode of the first transistor T1.

A third transistor T3 is connected between the second electrode of the first transistor T1 and the control electrode of the first transistor T1. The control electrode of the third transistor T3 is connected to the i-th scan line GLi. The third transistor T3 is turned on when the i-th scan signal is provided to the i-th scan line GLi, and electrically connects the second electrode of the first transistor T1 and the control electrode of the first transistor T1. Accordingly, when the third transistor T3 is turned on, the first transistor T1 is connected in the form of a diode.

A fourth transistor T4 is connected between a node ND and an initialization power generating unit (not shown). In addition, the control electrode of the fourth transistor T4 is connected to an i−1-th scan line GLi−1. The fourth transistor T4 is turned on when an i−1-th scan signal is provided to the i−1-th scan line GLi−1, and provides an initialization voltage Vint to the node ND.

The fifth transistor T5 is connected between the power line PL and the first electrode of the first transistor T1. The control electrode of the fifth transistor T5 is connected to the i-th light emission control line ECLi.

A sixth transistor T6 is connected between the second electrode of the first transistor T1 and the anode electrode of the light-emitting element EE. In addition, the control electrode of the sixth transistor T6 is connected to the i-th light emission control line ECLi.

A seventh transistor T7 is connected between the initialization power generating unit (not shown) and the anode of the light-emitting element EE. In addition, the control electrode of the seventh transistor T7 is connected to an i+1-th scan line GLi+1. The seventh transistor T7 is turned on when an i+1-th scan signal is provided to the i+1-th scan line GLi+1, and provides the initialization voltage Vint to the anode of the light-emitting element EE.

The seventh transistor T7 may improve black expression capability of the pixel PX. Specifically, when the seventh transistor T7 is turned on, a parasitic capacitor (not shown) of the light-emitting element EE is discharged. Then, when black luminance is implemented, the light-emitting element EE does not emit light due to a leakage current from the first transistor T1, and accordingly, the black expression capability may be improved.

Additionally, FIG. 5B illustrates the control electrode of the seventh transistor T7 being connected to the i+1$^{st}$ scan line GLi+1, but the invention is not limited thereto. In another embodiment of the invention, the control electrode of the seventh transistor T7 may be connected to the i-th scan line GLi or the i−1-th scan line GLi−1.

The capacitor CP is disposed between the power line PL and the node ND. The capacitor CP stores a voltage corresponding to a data signal. When the fifth transistor T5 and the sixth transistor T6 are turned on, the amount of current flowing through the first transistor T1 may be determined in accordance with the voltage stored in the capacitor CP.

In the invention, an equivalent circuit of the pixel PX is not limited to the equivalent circuit illustrated in FIG. 5B. In another embodiment of the invention, the pixel PX may be implemented in various forms for emitting the light-emitting element EE. Although FIG. 5B illustrates a p-channel metal-oxide-semiconductor ("PMOS") as a reference, the invention is not limited thereto. In another embodiment of the invention, the pixel circuit CC may consist of an n-channel metal-oxide-semiconductor ("NMOS"). In another embodiment of the invention, the pixel circuit CC may consist of a combination of an NMOS and a PMOS.

Although not illustrated in FIG. 5A, the display layer 110 may further include a power pattern disposed in the non-display area NDA. The power pattern is connected to a plurality of power lines PL. Accordingly, since the display layer 110 includes the power pattern, the same first power signal may be provided to the plurality of pixels PX.

The display pads PDD may include a first pad D1 and a second pad D2. The first pad may be provided in plural and connected to the data lines DL, respectively. The second pad D2 may be connected to a power pattern and electrically connected to the power line PL.

The display layer 110 may provide electrical signals provided from the outside through the display pads PDD to the pixels PX. The display pads PDD may further include pads for receiving other electrical signals in addition to the first pad D1 and the second pad D2, and are not limited to any particular embodiment.

In the illustrated embodiment, the display layer 110 may further include sensing pads TDD. The sensing pads TDD may be arranged spaced apart along the first direction DR1 with the display pads PDD interposed therebetween. The sensing pads TDD may be extended from a first contact hole CNT1. The first contact hole CNT1 overlaps a second contact hole CNT2 of the sensor layer 120 to be described later.

A plurality of trace lines TL1, TL2, and TL3 to be described later may be connected to the sensing pads TDD through the contact holes CNT1 and CNT2. Accordingly, a circuit board attached to the display layer 110 in an embodiment and a circuit board attached to the sensor layer 120 may be connected on the display layer 110.

Although not illustrated, in the non-display area NDA of the display layer 110, an area in which the display pads PDD and the sensing pads TDD are disposed may be bent based on an axis extended in the first direction DR1. Accordingly, a circuit board attached to the display pads PDD and the sensing pads TDD may be disposed on a lower portion of the display module 100.

Referring to FIG. 6, the sensor layer 120 may include a first sensing electrode TE1, a second sensing electrode TE2, and the plurality of trace lines TL1, TL2, and TL3. On the sensor layer 120, a sensing area SA and a non-sensing area NSA may be defined. The non-sensing area NSA may surround the sensing area SA. The sensing area SA may be a sensing region in which an input applied from the outside is sensed. The sensing area SA may overlap the display area DA (refer to FIG. 5A) of the display layer 110 (refer to FIG. 5A).

The sensor layer 120 may sense an external input by any one of a self-capacitance type method or a mutual capacitance type method. The first sensing electrode TE1 and the second sensing electrode TE2 may be variously modified in accordance with a method and disposed and connected.

The first sensing electrode TE1 may include first sensing patterns SP1 and first bridge patterns BP1. The first sensing electrode TE1 may be extended along the first direction DR1, and first sensing electrodes may be arranged spaced apart along the second direction DR2.

The first sensing patterns SP1 included in one first sensing electrode TE1 may be arranged spaced apart along the first direction DR1. At least one first bridge pattern BP1 may be disposed between two first sensing patterns SP1 adjacent to each other.

The second sensing electrode TE2 may include second sensing patterns SP2 and second bridge patterns BP2. The second sensing electrode TE2 may be extended along the second direction DR2, and second sensing electrodes may be arranged spaced apart along the first direction DR1.

The second sensing patterns SP2 included in one second sensing electrode TE2 may be arranged spaced apart along the second direction DR2. At least one second bridge pattern BP2 may be disposed between two second sensing patterns SP2 adjacent to each other.

The trace lines TL1, TL2, and TL3 are disposed in the non-sensing area NSA. The trace lines TL1, TL2, and T3 may include a first trace line TL1, a second trace line TL2, and a third trace line TL3.

The first trace line TL1 is connected to one end of the first sensing electrode TEL The second trace line TL2 is connected to one end of the second sensing electrode TE2. The third trace line TL3 is connected to the other end of the second sensing electrode TE2. The other end of the sensing electrode TE2 may be a portion opposing the one end of the second electrode TE2.

According to the invention, the second sensing electrode TE2 may be connected to the second trace line TL2 and to the third trace line TL3. Accordingly, sensitivity according to an area may be uniformly maintained for the second sensing electrode TE2, which is relatively long compared to the first sensing electrode TEL However, this is merely one of embodiments. In another embodiment, the third trace line TL3 may be omitted, and is not limited to any particular embodiment.

The second contact hole CNT2 may be defined in the sensor layer 120 in an embodiment. The second contact hole CNT2 may overlap the first contact hole CNT1 of the display layer 110. The trace lines TL1, TL2, and TL3 may be extended to a corresponding second contact hole CNT2. A conductive material may be disposed inside the first contact hole CNT1 and the second contact hole CNT2. Accordingly, the trace lines TL1, TL2, and TL3 may be connected to corresponding sensing pads TDD through the contact holes CNT1 and CNT2.

Figure 7A:
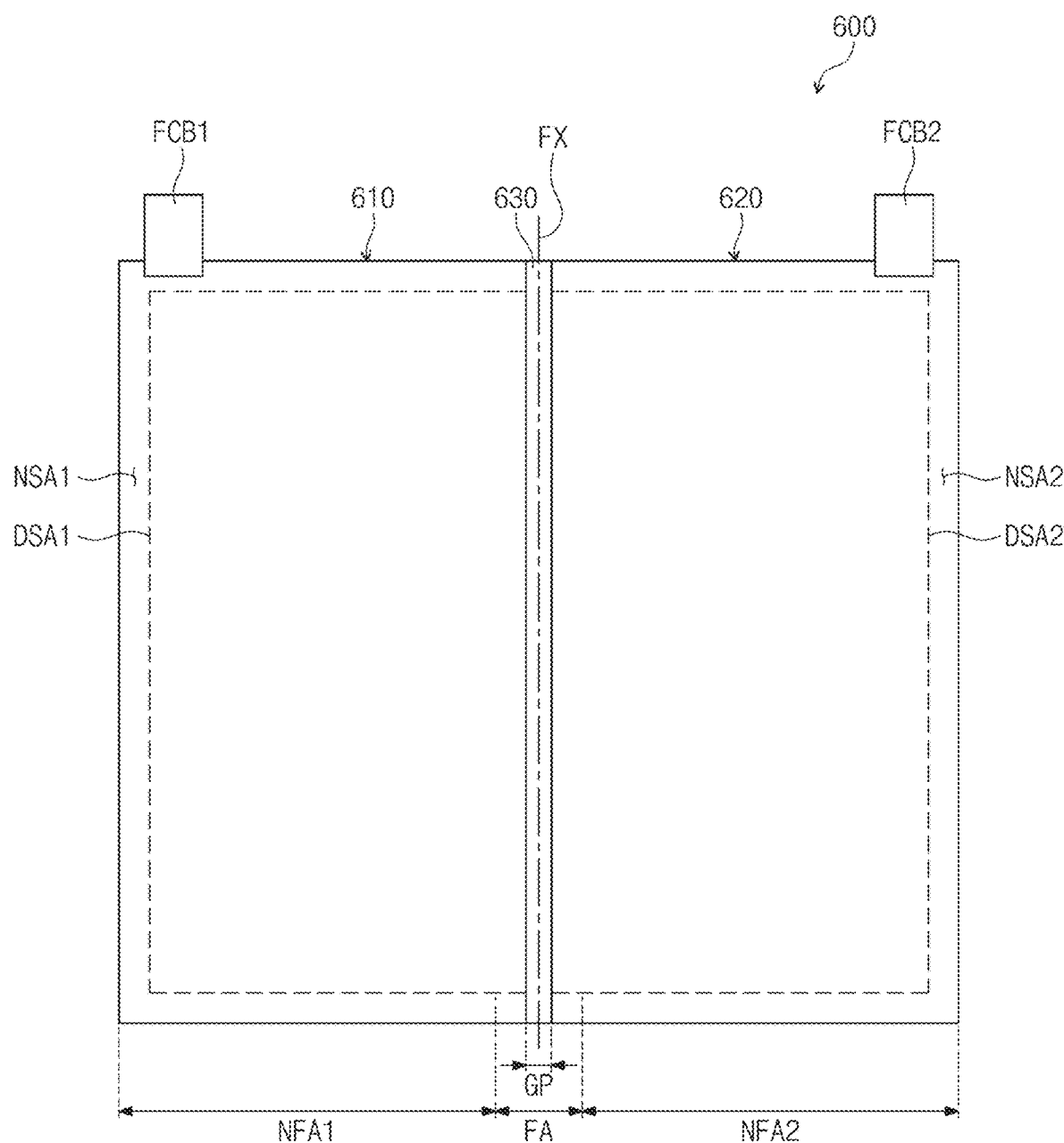
FIG. 7A is a plan view of an embodiment of a digitizer according to the invention.
Figure 7B:
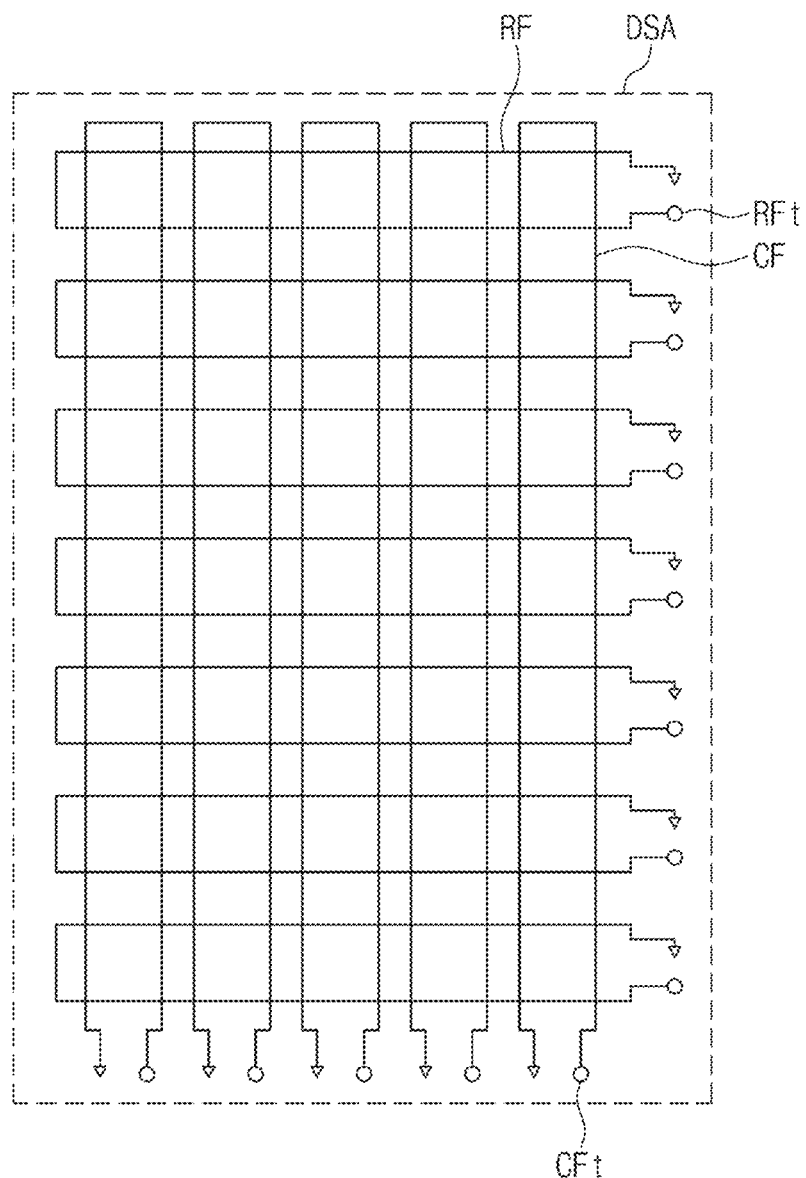
FIG. 7B is a plan view of an embodiment of a sensing area according to the invention.

FIG. 7A is a plan view of an embodiment of a digitizer according to the invention. FIG. 7B is a plan view of an embodiment of a sensing area according to the invention.

Referring to FIG. 7A and FIG. 7B, the digitizer 600 may include the first digitizer 610, the second digitizer 620, and the connection part 630 interposed therebetween. In an embodiment, the first digitizer 610 and the second digitizer 620 may be spaced apart from each other in the folding area FA with the connection part 630 interposed therebetween, for example.

The first digitizer 610 may be connected to a first flexible circuit film FCB1. To the second digitizer 620, a second flexible circuit film FCB2 may be connected. The first flexible circuit film FCB1 and the second flexible circuit film FCB2 may be connected to the same main circuit board, and the first digitizer 610 and the second digitizer 620 may be individually driven.

The first digitizer 610 may include a first sensing area DSA1 and a first non-sensing area NSA1 surrounding at least a portion of the first sensing area DSA1. In the invention, the first sensing area DSA1 may overlap at least a portion of the folding area FA.

The second digitizer 620 may include a second sensing area DSA2 and a second non-sensing area NSA2 surrounding at least a portion of the second sensing area DSA2. In the invention, the second sensing area DSA2 may overlap at least a portion of the folding area FA.

The first digitizer 610 and the second digitizer 620 may be spaced apart in the folding area FA with a predetermined gap GP interposed therebetween. The gap GP may correspond to an area in which the base layer BS is exposed from the components of the digitizer 600. In the gap GP, sensing coils CF and RF may not be disposed. Accordingly, the gap GP may be an area in which an input of the pen SP (refer to FIG. 1A) is not sensed.

According to the invention, in the first direction DR1, the width of the gap GP may be less than the width of the folding area FA. Therefore, the digitizer 600 according to the invention may sense the input of the pen SP inside the folding area FA.

Descriptions of the sensing coils CF and RF in the sensing area DSA to be described with reference to FIG. 7B may be applied to the first digitizer 610 and the second digitizer 620 of FIG. 7A, respectively.

Referring to FIG. 7B, the first and second digitizers 610 and 610 may respectively include a plurality of first sensing coils CF and a plurality of second sensing coils RF. The first sensing coils CF may be also referred to as driving coils, and the second sensing coils RF may be also referred to as sensing coils, but are not limited thereto, and may be vice versa.

The first sensing coils CF may each include long-side coils and a short-side coil. Each of the long-side coils may be extended in the second direction DR2, and the long-side coils may be spaced apart from each other along the first direction DR1. The short-side coil is disposed in a non-sensing area NSA, and may be connected to ends of each of the long-side coils forming one loop to connect between the long-side coils spaced apart from each other.

The short-side coil in an embodiment may be disposed in a different layer from the long-side coils. FIG. 7B illustrates that the first sensing coils CF forming one loop are spaced apart from each other, but the invention is not limited thereto, and long-side coils included in adjacent coils of the first sensing coils CF may be alternately arranged.

The second sensing coils RF may each include long-side coils and a short-side coil. Each of the long-side coils may be extended in the first direction DR1, and the long-side coils may be spaced apart from each other along the second direction DR2. The short-side coil is disposed in the non-sensing area NSA, and may be connected to ends of each of the long-side coils forming one loop to connect between the long-side coils spaced apart from each other.

FIG. 7B illustrates that the second sensing coils RF forming one loop are spaced apart from each other, but the invention is not limited thereto, and long-side coils included in adjacent coils of the second sensing coils RF may be alternately arranged.

An alternating signal may be sequentially provided to first terminals CFt of the first sensing coils CF. One terminal different from the first terminals CFt of the first sensing coils CF may be grounded. Signal lines (not shown) may be respectively connected to the first terminals CFt of the first sensing coils CF. The signal lines may be disposed in the non-sensing areas NSA1 and NSA2 illustrated in FIG. 7A.

When a current flows in the first sensing coils CF, a magnetic force line may be induced between the first sensing coils CF and the second sensing coils RF. The second sensing coils RF may sense induced electromagnetic force emitted from the pen SP (refer to FIG. 1A) and output the same to second terminals RFt of the second sensing coils RF as a sensing signal. One terminal different from the second terminals RFt of the second sensing coils RF may be grounded. Signal lines (not shown) may be respectively connected to the second terminals RFt of the second sensing coils RF. The signal lines may be disposed in the non-sensing areas NSA1 and NSA2 illustrated in FIG. 7A.

According to the invention, the first digitizer 610 and the second digitizer 620 may be separately disposed in the first non-folding area NFA1 and the second non-folding area NFA2 and may individually sense an input of the pen SP (refer to FIG. 1A), and may also sense the input of the pen SP even in some areas of the folding area FA.

First and second sensing coils included in digitizers 600, 600-A, and 600-B to be described below may correspond to the first and second sensing coils CF and RF described with reference to FIG. 7A and FIG. 7B, and redundant descriptors of the like elements will be omitted.

Figure 8:
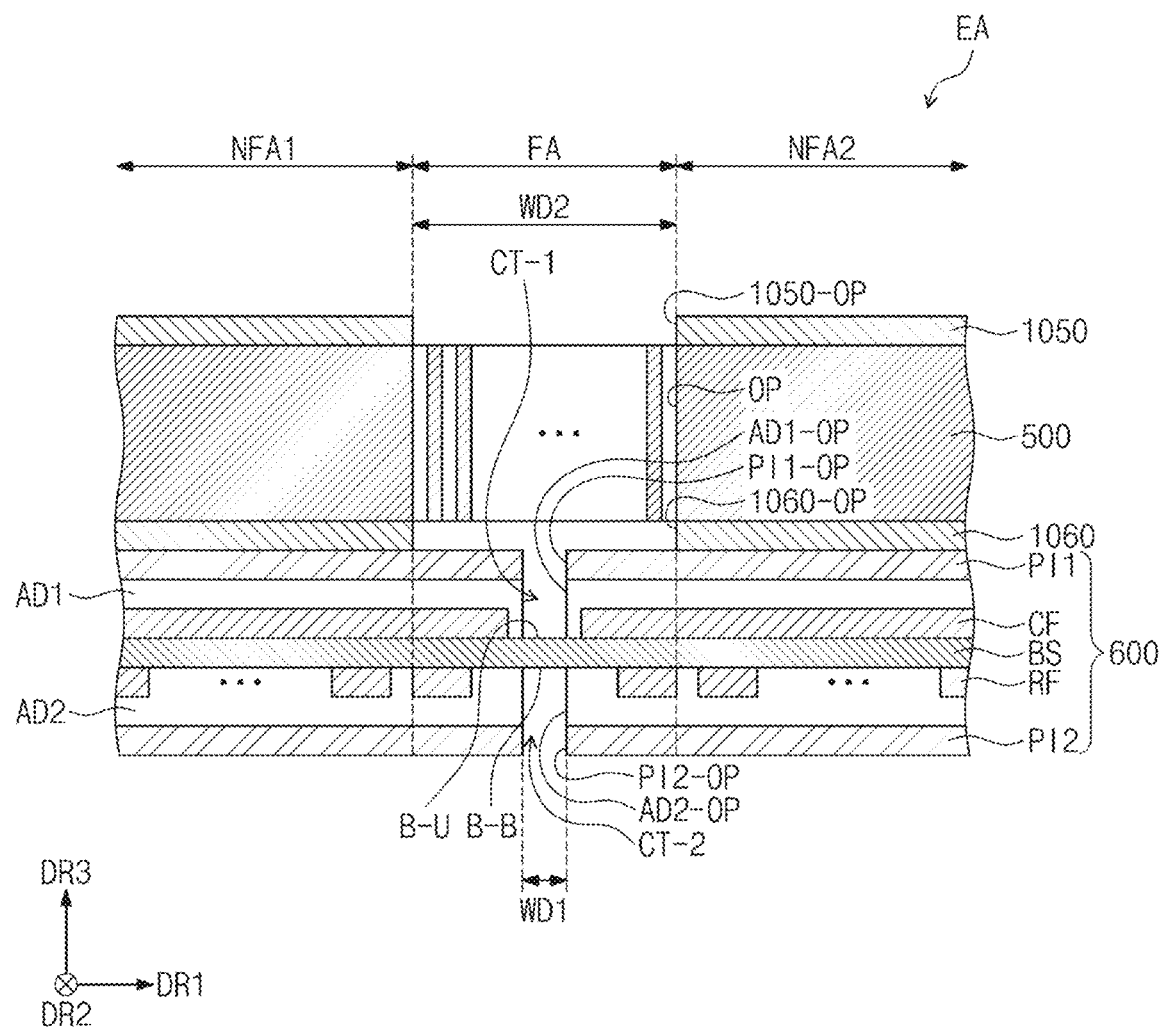
FIG. 8 is a cross-sectional view of an embodiment of a lower plate and a digitizer according to the invention.
Figure 9A:
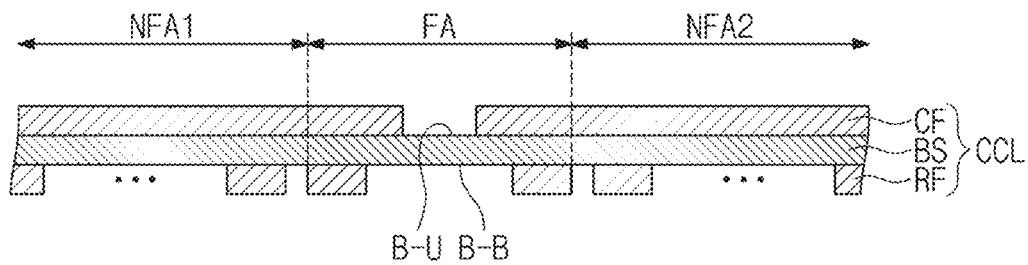
FIG. 9A to FIG. 9C are cross-sectional views illustrating an embodiment of a method for manufacturing a digitizer according to the invention.
Figure 9A:
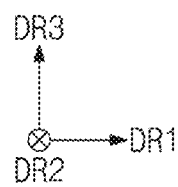
Figure 9B:
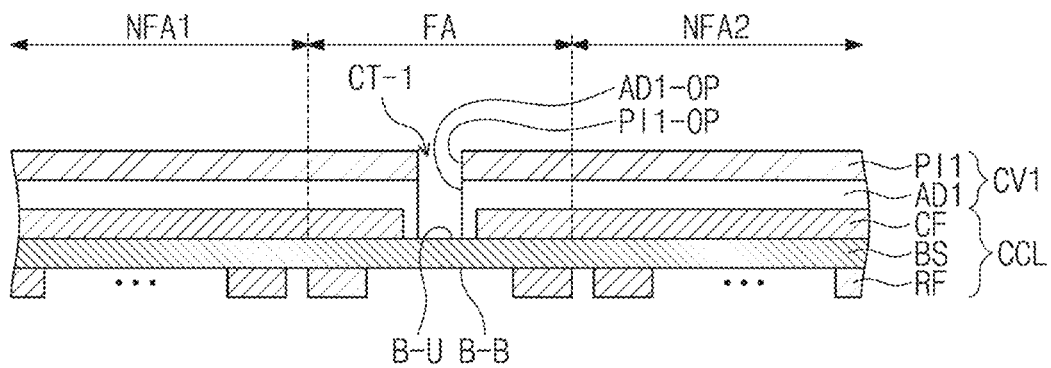
Figure 9B:
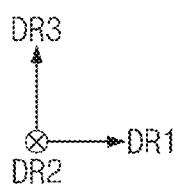
Figure 9C:
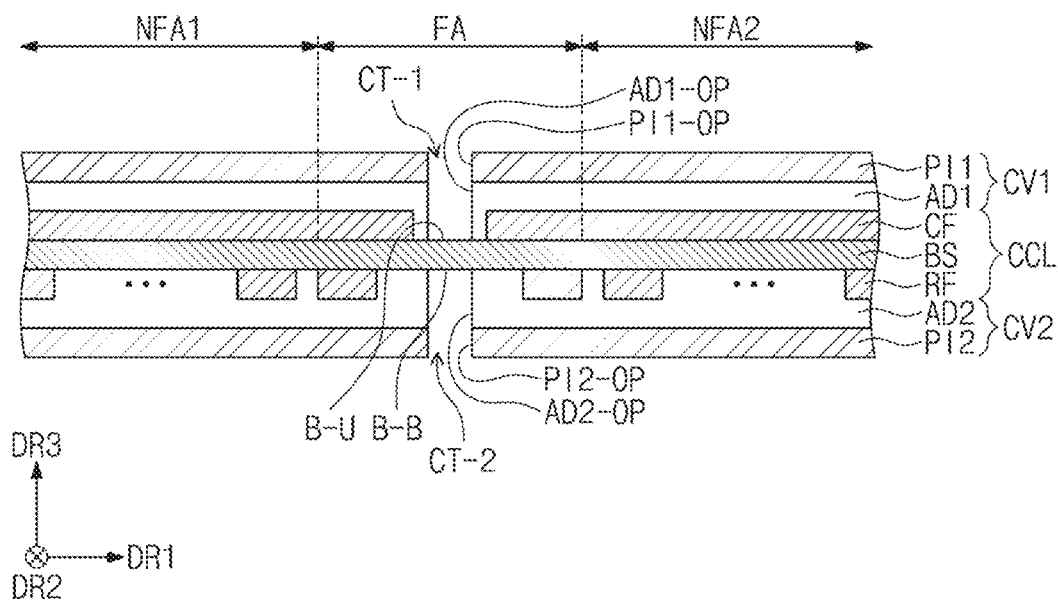

FIG. 8 is a cross-sectional view of an embodiment of a lower plate and a digitizer according to the invention. FIG. 9A to FIG. 9C are cross-sectional views illustrating an embodiment of a method for manufacturing a digitizer according to the invention. Among the components of the electronic apparatus EA described with reference to FIG. 3A, only the lower plate 500, the adhesive layers 1050 and 1060, and the digitizer 600 are illustrated, and the rest of the components are omitted.

Referring to FIG. 8, the digitizer 600 of the electronic apparatus EA in an embodiment may include a base layer BS including an upper surface B-U and a lower surface B-B, a first sensing coil CF disposed on the upper surface B-U, a second sensing coil RF disposed on the lower surface B-B, a first cover layer PI1 which covers the first sensing coil CF, and a second cover layer PI2 which covers the second sensing coil RF. The first sensing coil CF and the second sensing coil RF may correspond to any one of the first sensing coils CF and the second sensing coils RF described with reference to FIG. 7B.

The digitizer 600 may include a first adhesive layer AD1 disposed between the base layer BS and the first cover layer PI1 and a second adhesive layer AD2 disposed between the base layer BS and the second cover layer PI2.

The base layer BS may be disposed in the folding area FA and the non-folding areas NFA1 and NFA2. The base layer BS is disposed in the folding area FA, and thus, may include a material which facilitates folding.

In an embodiment, the base layer BS may include a synthetic rubber and an elastic rubber including a cross-linking component, for example. In an embodiment, the synthetic rubber may include at least one of butadiene rubber, styrene-butadiene rubber, and butyl rubber, for example.

In the illustrated embodiment, the thickness of the base layer BS may be about 10 µm to about 100 µm. In an embodiment, a modulus of the base layer BS may be about 10 megapascals (MPa) to about 100 MPa.

The first sensing coil CF may be extended in the first direction DR1, and may overlap a portion of the folding area FA and the non-folding areas NFA1 and NFA2. First sensing coils included in digitizers 610 and 620 (refer to FIG. 7A) different from each other may be spaced apart from each other in the folding area FA.

The second sensing coil RF may be extended in the second direction DR2, and may overlap a portion of the folding area FA and the non-folding areas NFA1 and NFA2. Second sensing coils included in digitizers 610 and 620 (refer to FIG. 7A) different from each other may be spaced apart from each other in the folding area FA.

The first cover layer PI1 may overlap a portion of the folding area FA and the non-folding areas NFA1 and NFA2. The first cover layer PI1 may cover the first sensing coil CF.

The first adhesive layer AD1 may couple the first cover layer PI1 and the base layer BS by being disposed between the first cover layer PI1 and the base layer BS, and may contact the first sensing coil CF.

First cover layers PI1 included in each of the digitizers 610 and 620 different from each other may be spaced apart from each other in the folding area FA and define a first cover separation space PI1-OP, and first adhesive layers AD1 included in each of the digitizers 610 and 620 different from each other may be spaced apart from each other in the folding area FA and define a first adhesive separation space AD1-OP.

A side surface of the first cover layer PI1 which defines the first cover separation space PI1-OP and a side surface of the first adhesive layer AD1 which defines the first adhesive separation space AD1-OP may be aligned with each other. In the illustrated embodiment, the first cover separation space PI1-OP and the first adhesive separation space AD1-OP overlapping each other may be defined as a first cut area CT-1.

In the folding area FA, a portion of the upper surface B-U of the base layer BS may be exposed from the first cover layers PI1 and the first adhesive layers AD1 by the first cut area CT-1.

The second cover layer PI2 may overlap a portion of the folding area FA and the non-folding areas NFA1 and NFA2. The second cover layer PI2 may cover the second sensing coil RF.

In the illustrated embodiment, the first and second cover layers PI1 and PI2 may include polyimide.

The second adhesive layer AD2 may couple the second cover layer PI2 and the base layer BS by being disposed between the second cover layer PI2 and the base layer BS, and may contact the second sensing coil RF.

Second cover layers PI2 included in each of the digitizers 610 and 620 different from each other may be spaced apart from each other in the folding area FA and define a second cover separation space PI2-OP, and second adhesive layers AD2 included in each of the digitizers 610 and 620 different from each other may be spaced apart from each other in the folding area FA and define a second adhesive separation space AD2-OP.

A side surface of the second cover layer PI2 which defines the second cover separation space PI2-OP and a side surface of the second adhesive layer AD2 which defines the second adhesive separation space AD2-OP may be aligned with each other. Accordingly, the second cover separation space PI2-OP and the second adhesive separation space AD2-OP overlapping each other may be defined as a second cut area CT-2.

In the folding area FA, a portion of the lower surface B-B of the base layer BS may be exposed from the second cover layers PI2 and the second adhesive layers AD2 by the second cut area CT-2.

In the illustrated embodiment, in a non-folding state, a first width WD1 of each of the first and second cut areas CT-1 and CT-2 in the first direction DR1 may be less than a second width WD2 of the folding area FA. The first width WD1 may be about 0.5 mm to about 4 mm, and the second width WD2 may be about 5 mm to about 50 mm.

Referring to FIG. 9A to FIG. 9C, a method for manufacturing the digitizer 600 illustrated in FIG. 8 will be described. The method for manufacturing the digitizer 600 in the illustrated embodiment may include providing a coil sheet CCL, coupling a first cover substrate CV1, and coupling a second cover substrate CV2.

The coil sheet CCL may be provided in a state in which the first sensing coil CF is disposed on the upper surface B-U of the base layer BS and the second sensing coil RF is disposed on the lower surface B-B of the base layer BS. Hereinafter, a 'coil sheet' to be described in the manufacturing method of a digitizer may be defined as a sheet provided in a state in which a sensing coil is disposed on a base layer.

The first cover substrate CV1 may be provided in a state in which the first adhesive layer AD1 is coupled to the first cover layer PI1. The first cover substrate CV1 may be disposed on the upper surface B-U of the base layer BS.

The first cover substrate CV1 is disposed in each of the digitizers 610 and 620 (refer to FIG. 7A) different from each other, and the first cover substrates may be spaced apart from each other in the folding area FA. In an embodiment, the first cover layers PI1 included in each of the digitizers 610 and 620 different from each other may be spaced apart from each other with the first cover separation space PI1-OP in the folding area FA, and the first adhesive layers AD1 may be spaced apart from each other with the first adhesive separation space AD1-OP in the folding area FA, for example.

Therefore, in the folding area FA, a portion of the upper surface B-U of the base layer BS may be exposed from the first cover layers PI1 and the first adhesive layers AD1 by the first cover separation space PI1-OP and the first adhesive separation space AD1-OP.

The second cover substrate CV2 may be provided in a state in which the second adhesive layer AD2 is coupled to the second cover layer PI2. The second cover substrate CV2 may be disposed on the lower surface B-B of the base layer BS.

The second cover substrate CV2 is disposed in each of the digitizers 610 and 620 (refer to FIG. 7A) different from each other, and the second cover substrates may be spaced apart from each other in the folding area FA. In an embodiment, the second cover layers PI2 included in each of the digitizers 610 and 620 different from each other may be spaced apart from each other with the second cover separation space PI2-OP in the folding area FA, and the second adhesive layers AD2 may be spaced apart from each other with the second adhesive separation space AD2-OP in the folding area FA, for example.

Therefore, in the folding area FA, a portion of the lower surface B-B of the base layer BS may be exposed from the second cover layers PI2 and the second adhesive layers AD2 by the second cover separation space PI2-OP and the second adhesive separation space AD2-OP.

According to the invention, in the digitizer 600, only the base layer BS whose folding properties are excellent is disposed to overlap the folding area FA, and other components are disposed to spaced apart from each other in the folding area FA, so that stress applied to the digitizer 600 may be reduced during folding. Therefore, cracking of the sensing coils CF and RF included in the digitizer 600 may be reduced, and the tearing of the cover layers PI1 and PI2 including polyimide may be prevented. Accordingly, the electronic apparatus EA including the digitizer 600 with improved performance may be provided.

Figure 10:
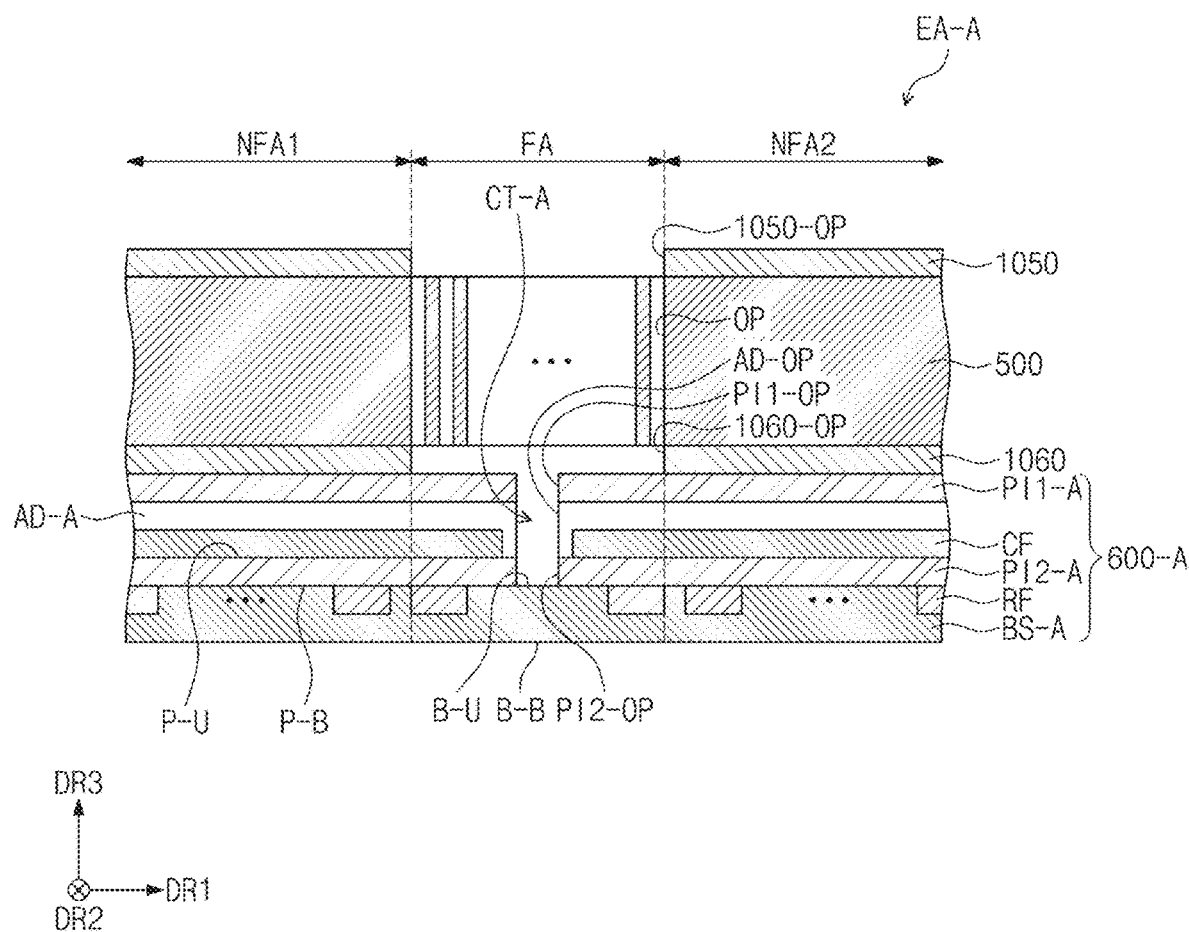
FIG. 10 is a cross-sectional view of an embodiment of a lower plate and a digitizer according to the invention.
Figure 11A:
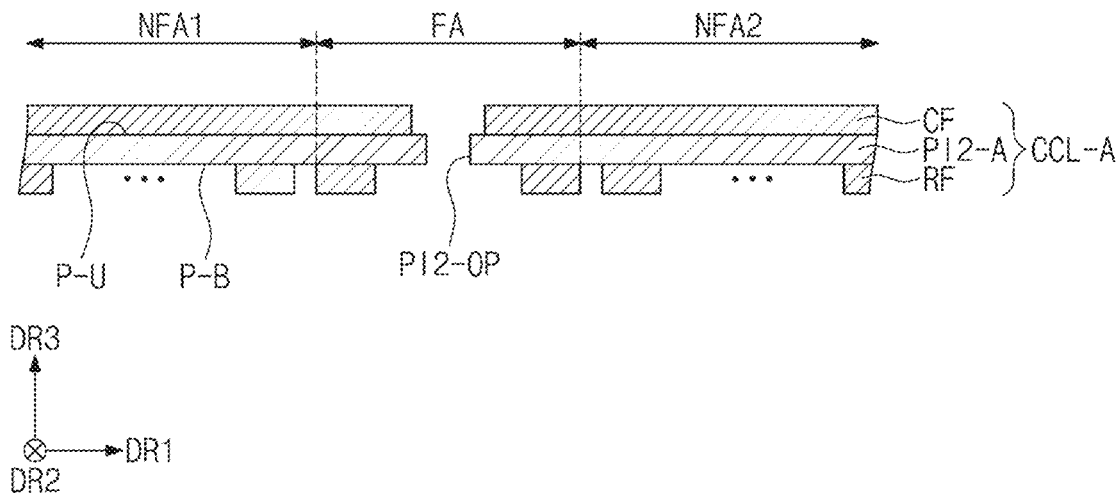
FIG. 11A to FIG. 11C are cross-sectional views illustrating an embodiment of a method for manufacturing a digitizer according to the invention.
Figure 11B:
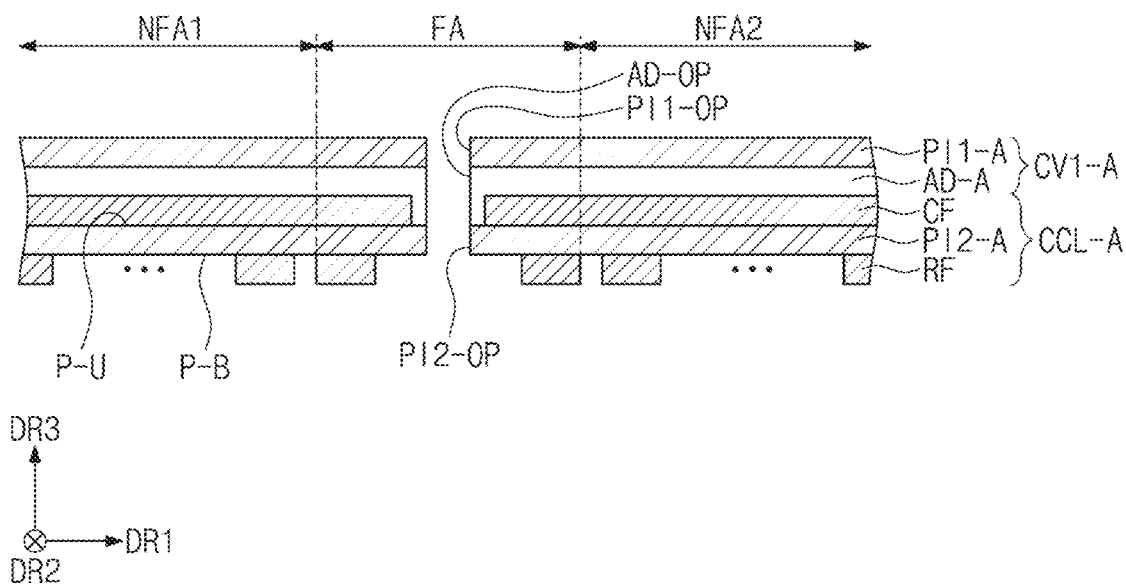
Figure 11C:
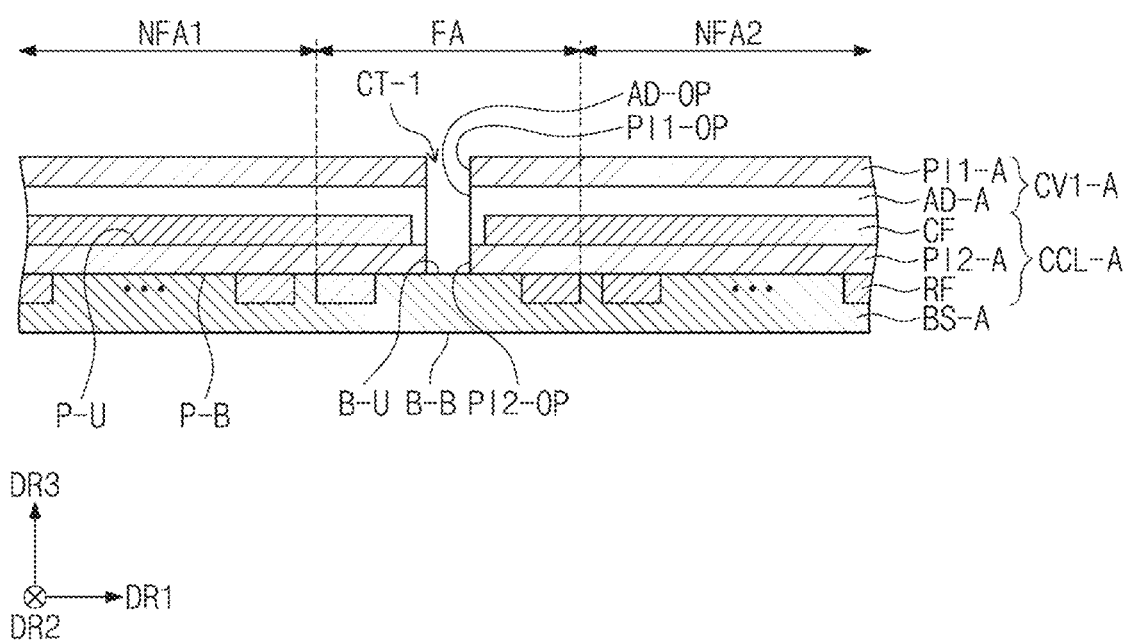

FIG. 10 is a cross-sectional view of an embodiment of a lower plate and a digitizer according to the invention. FIG. 11A to FIG. 11C are cross-sectional views illustrating an embodiment of a method for manufacturing a digitizer according to the invention. Among the components of the electronic apparatus EA described with reference to FIG. 3A, only the components corresponding to the lower plate 500, the adhesive layers 1050 and 1060, and the digitizer 600 are illustrated, and the rest of the components are omitted. Descriptions which are the same as those described with reference to FIG. 8 to FIG. 9C will be omitted.

Referring to FIG. 10, a digitizer 600-A of an electronic apparatus EA-A in an embodiment may include a second cover layer PI2-A including an upper surface P-U and a lower surface P-B, a first sensing coil CF, a second sensing coil RF, a first cover layer PI1-A which covers the first sensing coil CF, and a base layer BS-A which covers the second sensing coil RF.

The digitizer 600-A may include an adhesive layer AD-A disposed between the first cover layer PI1-A and the second cover layer PI2-A.

In the illustrated embodiment, the first sensing coil CF may be disposed on the upper surface P-U of the second cover layer PI2-A, and the second sensing coil RF may be disposed on the lower surface P-B of the second cover layer PI2-A.

The first cover layer PI1-A may overlap a portion of the folding area FA and the non-folding areas NFA1 and NFA2. The first cover layer PI1-A may cover the first sensing coil CF.

The adhesive layer AD-A may couple the first cover layer PI1-A and the second cover layer PI2-A by being disposed between the first cover layer PI1-A and the second cover layer PI2-A, and may contact the first sensing coil CF.

The second cover layer PI2-A may overlap a portion of the folding area FA and the non-folding areas NFA1 and NFA2.

In the illustrated embodiment, the base layer BS-A may overlap the folding area FA and the non-folding areas NFA1 and NFA2. The base layer BS-A may be disposed on a lower portion of the second cover layer PI2-A, and may contact the second sensing coil RF. Therefore, among the components of the digitizer 600-A, the base layer BS-A may be a component disposed farthest from the display module 100.

First cover layers PI1-A included in each of the digitizers 610 and 620 different from each other may be spaced apart from each other in the folding area FA and define a first cover separation space PI1-OP, and first adhesive layers AD-A included in each of the digitizers 610 and 620 different from each other may be spaced apart from each other in the folding area FA and define an adhesive separation space AD-OP. In addition, second cover layers PI2-A included in each of the digitizers 610 and 620 different from each other may be spaced apart from each other in the folding area FA and define a second cover separation space PI2-OP.

A side surface of the first cover layer PI1-A which defines the first cover separation space PI1-OP, a side surface of the adhesive layer AD-A which defines the adhesive separation space AD-OP, and a side surface of the second cover layer PI2-A which defines the second cover separation space PI2-OP may be aligned with each other. In the illustrated embodiment, the first cover separation space PI1-OP, the adhesive separation space AD-OP, and the second cover separation space PI2-OP overlapping each other may be defined as a cut area CT-A.

In the folding area FA, a portion of an upper surface B-U of the base layer BS-A may be exposed from the first cover layers PI1-A, the adhesive layers AD-A, and the second cover layers PI2-A by the cut area CT-A.

When the electronic apparatus EA-A is folded, the greatest tensile stress is applied to a component disposed on the outermost periphery of the digitizer 600-A. In the illustrated embodiment, the base layer BS-A disposed on the outermost periphery of the digitizer 600-A includes a material whose folding properties are excellent, and thus, may reduce stress applied to the digitizer 600-A during folding. In addition, since disposed overlapping the folding area FA, the base layer BS may block foreign matters from being introduced to the openings OP of the lower plate 500.

Referring to FIG. 11A to FIG. 11C, a method for manufacturing the digitizer 600-A illustrated in FIG. 10 will be described. The method for manufacturing the digitizer 600-A in the illustrated embodiment may include providing a coil sheet CCL-A, coupling a first cover substrate CV1-A, and coupling the base layer BS-A.

The coil sheet CCL-A may be provided in a state in which the first sensing coil CF is disposed on the upper surface P-U of the second cover layer PI2-A and the second sensing coil RF is disposed on the lower surface P-B of the second cover layer PI2-A.

The coil sheet CCL-A may be disposed in each of the digitizers 610 and 620 (refer to FIG. 7A) different from each other, and the coil sheets CCL-A may be spaced apart from each other in the folding area FA. In an embodiment, the second cover layers PI2-A included in each of the digitizers 610 and 620 different from each other may be spaced apart from each other with the second cover separation space PI2-OP in the folding area FA, for example.

The first cover substrate CV1-A may be provided in a state in which the adhesive layer AD-A is coupled to the first cover layer PI1-A. The first cover substrate CV1-A may be disposed on the upper surface P-U of the second cover layer PI2-A.

The first cover substrate CV1-A is disposed in each of the digitizers 610 and 620 (refer to FIG. 7A) different from each other, and the first cover substrates CV1-A may be spaced apart from each other in the folding area FA. In an embodiment, the first cover layers CV1-A included in each of the digitizers 610 and 620 different from each other may be spaced apart from each other with the first cover separation space PI1-OP in the folding area FA, and the adhesive layers AD-A may be spaced apart from each other with the adhesive separation space AD-OP in the folding area FA.

The base layer BS-A may be disposed on the lower surface P-B of the second cover layer PI2-A. The base layer BS-A overlaps the folding area FA and the non-folding areas NFA1 and NFA2. Therefore, the base layer BS-A may be disposed on the lower surface P-B of each of the second cover layers PI2-A included in the digitizers 610 and 620 (refer to FIG. 7A) different from each other. The base layer BS-A may contact the second sensing coil RF.

In the illustrated embodiment, in the folding area FA, a portion of the upper surface B-U of the base layer BS-A may be exposed from the first cover layers PI1-A, the adhesive layers AD-A, and the second cover layers PI2-A by the first cover separation space PI1-OP, the adhesive separation space AD-OP, and the second cover separation space PI2-OP.

Figure 12:
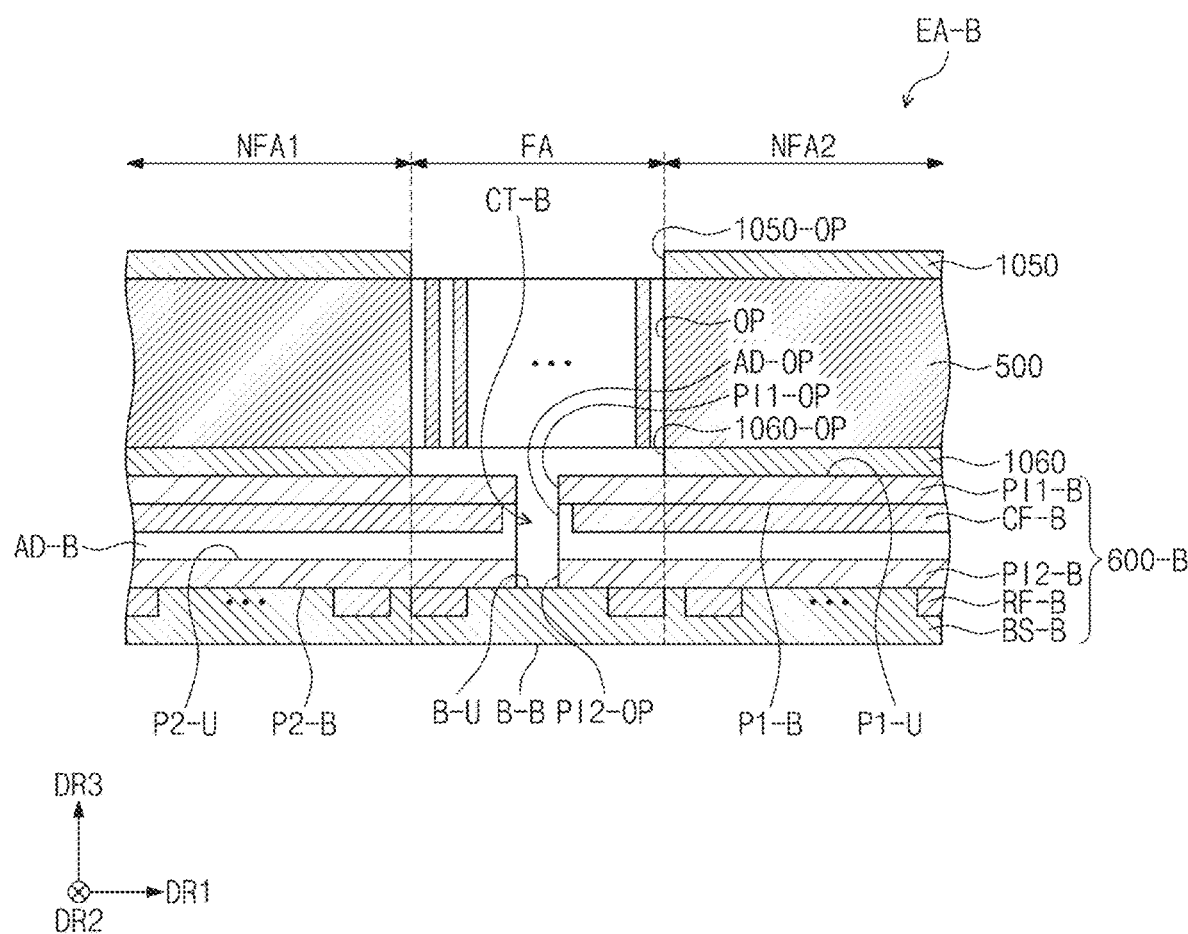
FIG. 12 is a cross-sectional view of an embodiment of a lower plate and a digitizer according to the invention.
Figure 13A:
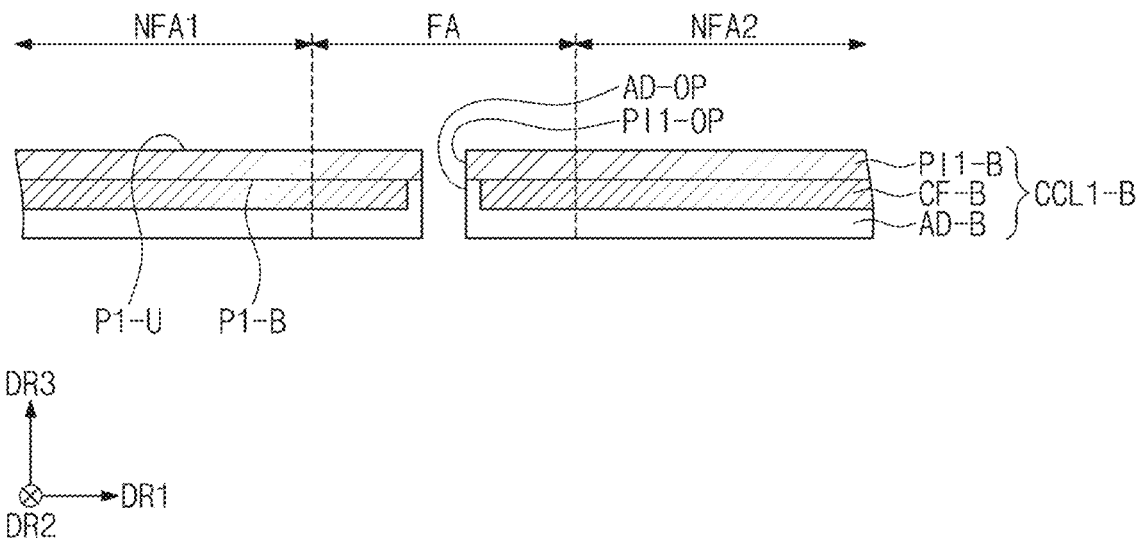
FIG. 13A to FIG. 13C are cross-sectional views illustrating an embodiment of a method for manufacturing a digitizer according to the invention.
Figure 13B:
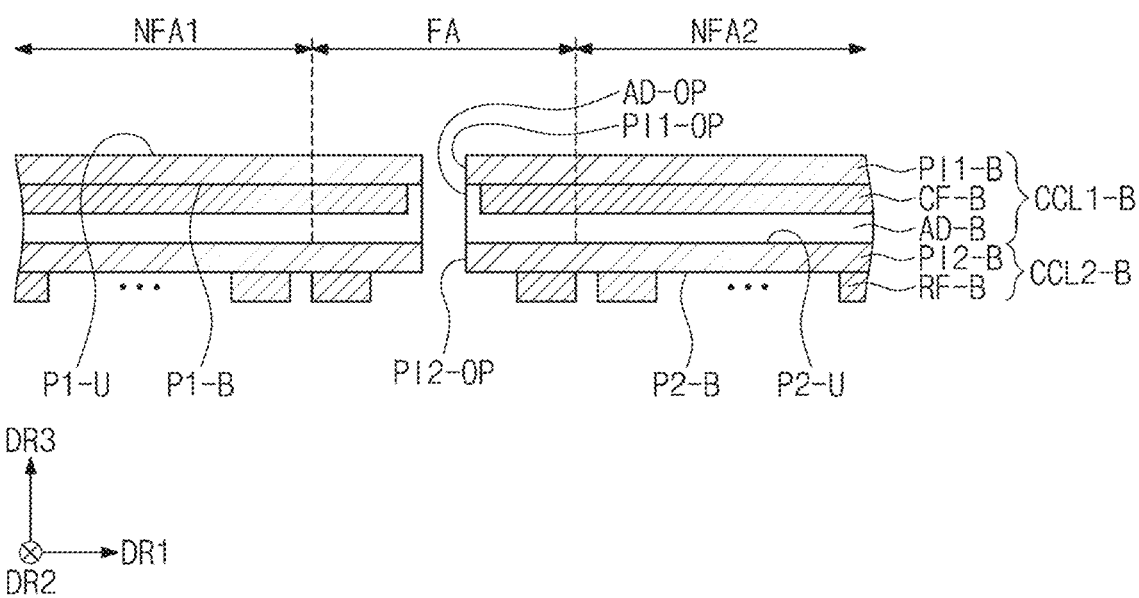
Figure 13C:
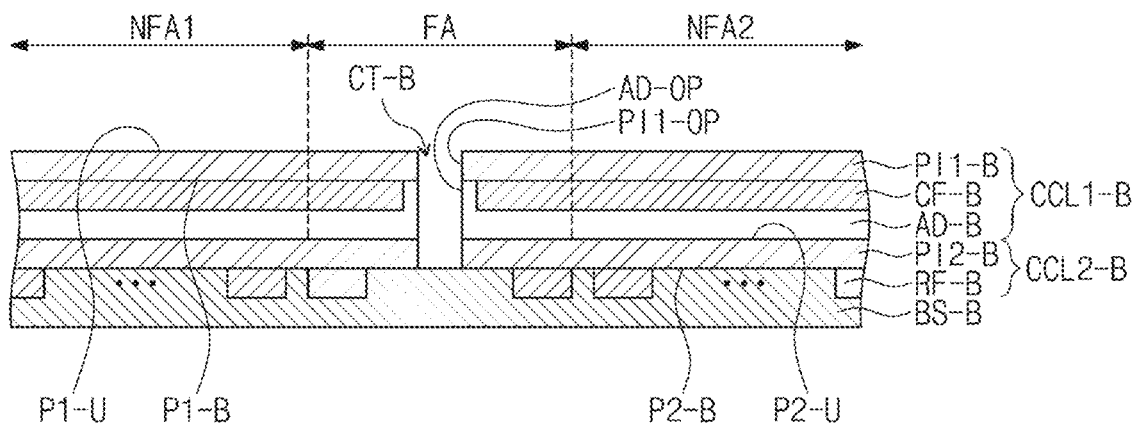

FIG. 12 is a cross-sectional view of an embodiment of a lower plate and a digitizer according to the invention. FIG. 13A to FIG. 13C are cross-sectional views illustrating an embodiment of a method for manufacturing a digitizer according to the invention. Among the components of the electronic apparatus EA described with reference to FIG. 3A, only the components corresponding to the lower plate 500, the adhesive layers 1050 and 1060, and the digitizer 600 are illustrated, and the rest of the components are omitted. Descriptions which are the same as those described with reference to FIG. 8 to FIG. 11C will be omitted.

Referring to FIG. 12, a digitizer 600-B of an electronic apparatus EA-B in an embodiment may include a first cover layer PI1-B including a first upper surface P1-U facing the lower plate 500 and a first lower surface P1-B opposing the first upper surface P1-U, a second cover layer PI2-B including a second upper surface P2-U facing the first lower surface P1-B and a second lower surface P2-B opposing the second upper surface P2-U, a first sensing coil CF-B, a second sensing coil RF-B, and a base layer BS-B.

The digitizer 600-B may include an adhesive layer AD-B disposed between the first cover layer PI1-B and the second cover layer PI2-B.

In the illustrated embodiment, the first sensing coil CF-B may be disposed on the first lower surface P1-B, and the second sensing coil RF-B may be disposed on the second lower surface P2-B.

The first cover layer PI1-B may overlap a portion of the folding area FA and the non-folding areas NFA1 and NFA2.

The adhesive layer AD-B may couple the first cover layer PI1-A and the second cover layer PI2-A by being disposed between the first cover layer PI1-A and the second cover layer PI2-A, and may contact the first sensing coil CF-B.

The second cover layer PI2-B may overlap a portion of the folding area FA and the non-folding areas NFA1 and NFA2.

In the illustrated embodiment, the base layer BS-B may overlap the folding area FA and the non-folding areas NFA1 and NFA2. The base layer BS-B may be disposed on a lower portion of the second cover layer PI2-B, and may contact the second sensing coil RF-B. Therefore, among the components of the digitizer 600-B, the base layer BS-B be a component disposed farthest from the display module 100.

First cover layers PI1-B included in each of the digitizers 610 and 620 different from each other may be spaced apart from each other in the folding area FA and define a first cover separation space PI1-OP, and adhesive layers AD-B included in each of the digitizers 610 and 620 different from each other may be spaced apart from each other in the folding area FA and define an adhesive separation space AD-OP. In addition, second cover layers PI2-B included in each of the digitizers 610 and 620 different from each other may be spaced apart from each other in the folding area FA and define a second cover separation space PI2-OP.

A side surface of the first cover layer PI1-B which defines the first cover separation space PI1-OP, a side surface of the adhesive layer AD-B which defines the adhesive separation space AD-OP, and a side surface of the second cover layer PI2-B which defines the second cover separation space PI2-OP may be aligned with each other. In the illustrated embodiment, the first cover separation space PI1-OP, the adhesive separation space AD-OP, and the second cover separation space PI2-OP overlapping each other may be defined as a cut area CT-B.

In the folding area FA, a portion of an upper surface B-U of the base layer BS-B may be exposed from the first cover layers PI1-B, the adhesive layers AD-B, and the second cover layers PI2-B by the cut area CT-B.

Referring to FIG. 13A to FIG. 13C, a method for manufacturing the digitizer 600-B illustrated in FIG. 12 will be described. The method for manufacturing the digitizer 600-B in the illustrated embodiment may include providing a first coil sheet CCL1-B, coupling a second coil sheet CCL2-B, and coupling the base layer BS-B.

The first coil sheet CCL1-B may be provided in a state in which the first sensing coil CF-B disposed on the first lower surface P1-B of the first cover layer PI1-B and the adhesive layer AD-B in contact with the first sensing coil CF-B are disposed.

The second coil sheet CCL2-B may include the second sensing coil RF-B disposed on the second lower surface P2-B of the second cover layer PI2-B.

In the coupling of the second coil sheet CCL2-B, the second upper surface P2-U of the second cover layer PI2-B may be attached to the adhesive layer AD-B of the first coil sheet CCL1-B.

The first coil sheet CCL1-B is disposed in each of the digitizers 610 and 620 (refer to FIG. 7A) different from each other, and the first coil sheets CCL1-B may be spaced apart from each other in the folding area FA. In an embodiment, the first cover layers PI1-B included in each of the digitizers 610 and 620 different from each other may be spaced apart from each other with the first cover separation space PI1-OP in the folding area FA, for example. The adhesive layers AD-B included in each of the digitizers 610 and 620 different from each other may be spaced apart from each other with the adhesive separation space AD-OP in the folding area FA.

The second coil sheet CCL2-B is disposed in each of the digitizers 610 and 620 (refer to FIG. 7A) different from each other, and the second coil sheets CCL2-B may be spaced apart from each other in the folding area FA. In an embodiment, the second cover layers PI2-B included in each of the digitizers 610 and 620 different from each other may be spaced apart from each other with the second cover separation space PI2-OP in the folding area FA, for example.

The base layer BS-B be disposed on the second lower surface P2-B of the second cover layer PI2-B. The base layer BS-B overlaps the folding area FA and the non-folding areas NFA1 and NFA2. Therefore, the base layer BS-B may be disposed on the second lower surface P2-B of each of the second cover layers PI2-B included in the digitizers 610 and 620 (refer to FIG. 7A) different from each other. The base layer BS-B may contact the second sensing coil RF-B.

In the illustrated embodiment, in the folding area FA, a portion of the upper surface B-U of the base layer BS-B may be exposed from the first cover layers PI1-B, the adhesive layers AD-B, and the second cover layers PI2-B by the first cover separation space PI1-OP, the adhesive separation space AD-OP, and the second cover separation space PI2-OP.

In the illustrated embodiment, in a digitizer, only a base layer whose folding properties are excellent is disposed to overlap a folding area, and other components are disposed to spaced apart from each other in the folding area, so that stress applied to the digitizer may be reduced during folding.

Therefore, cracking of sensing coils included in the digitizer may be reduced, and tearing of cover layers including polyimide may be prevented. Accordingly, an electronic apparatus including a digitizer with improved performance may be provided.

Although the invention has been described with reference to preferred embodiments of the invention, it will be understood by those skilled in the art that various modifications and changes in form and details may be made therein without departing from the spirit and scope of the invention as set forth in the following claims.

Accordingly, the technical scope of the invention is not intended to be limited to the contents set forth in the detailed description of the specification, but is intended to be defined by the appended claims.

What is claimed is:
1. An electronic apparatus comprising:
a display module including:
non-folding areas arranged along a first direction; and
a folding area disposed between the non-folding areas and foldable along a virtual folding axis extended along a second direction crossing the first direction;
a lower plate which is disposed on a lower portion of the display module and in which lower openings overlapping the folding area are defined; and
a digitizer including:
a first cover layer disposed on a lower portion of the lower plate;
first sensing coils;
second sensing coils insulated from the first sensing coils, a second cover layer;
a base layer comprising a first upper surface facing the first cover layer and a first lower surface opposing the first upper surface; and
at least one of a first adhesive layer disposed between the first upper surface and the first cover layer and in contact with the first sensing coils or a second adhesive layer disposed between the first lower surface and the second cover layer and in contact with the second sensing coils,
wherein:
each of the first cover layer, the first sensing coils, the second sensing coils, and the second cover layer does not overlap a portion of the folding area;
the base layer is exposed by the first cover layer and the second cover layer in the folding area, and
the first adhesive layer exposes the first upper surface in the folding area and the second adhesive layer exposes the first lower surface in the folding area.

2. The electronic apparatus of claim 1, wherein each of the first cover layer and the second cover layer includes a first portion and a second portion spaced apart from each other with a first width in the folding area, wherein in the first direction, the first width is smaller than a second width of the folding area.

3. The electronic apparatus of claim 2, wherein in a non-folding state, the first width is about 0.5 millimeter to about 4 millimeters, and the second width is about 5 millimeters to about 50 millimeters.

4. The electronic apparatus of claim 1,
the first sensing coils are disposed on the first upper surface, and the second sensing coils are disposed on the first lower surface;

the first cover layer faces the first upper surface and covers the first sensing coils; and the second cover layer faces the first lower surface and covers the second sensing coils.

5. The electronic apparatus of claim 4, further comprising both of the first adhesive layer and the second adhesive layer.

6. The electronic apparatus of claim 1, wherein the second cover layer comprises a second upper surface facing the first cover layer and a second lower surface opposing the second upper surface, wherein:

the first sensing coils are disposed on the second upper surface, and the second sensing coils are disposed on the second lower surface;

the first cover layer faces the second upper surface and covers the first sensing coils; and the base layer is disposed on the second lower surface and contacts the second sensing coils.

7. The electronic apparatus of claim 6, wherein the first adhesive layer is disposed between the second upper surface and the first cover layer and is in contact with the first sensing coils.

8. The electronic apparatus of claim 1, wherein:

the first cover layer comprises a third upper surface facing the lower plate and a third lower surface opposing the third upper surface; and the second cover layer comprises a fourth upper surface facing the first cover layer and a fourth lower surface opposing the fourth upper surface, wherein:

the first sensing coils are disposed on the third lower surface, and the second sensing coils are disposed on the fourth lower surface; and the base layer is disposed on the fourth lower surface and contacts the second sensing coils.

9. The electronic apparatus of claim 8, wherein the first adhesive layer is disposed between the third lower surface and the fourth upper surface and is in contact with the first sensing coils.

10. The electronic apparatus of claim 1, further comprising an adhesive layer disposed between the lower plate and the digitizer, overlapping the non-folding areas, spaced apart from the folding area, and exposing the lower openings.

11. The electronic apparatus of claim 1, further comprising a panel protection layer disposed between the display module and the lower plate.

12. The electronic apparatus of claim 1, wherein each of the first cover layer and the second cover layer comprises polyimide.

13. The electronic apparatus of claim 1, wherein the digitizer comprises a first digitizer overlapping one of the non-folding areas and a second digitizer overlapping a remaining one of the non-folding areas and spaced apart from the first digitizer in the first direction in the folding area.

14. The electronic apparatus of claim 1, wherein the base layer comprises a synthetic rubber and a cross-linkable composition, wherein the synthetic rubber includes at least one of butadiene rubber, styrene-butadiene rubber, or butyl rubber.

15. The electronic apparatus of claim 1, wherein a thickness of the base layer is about 10 micrometers to about 100 micrometers.

16. The electronic apparatus of claim 1, wherein a modulus of the base layer is about 10 megapascals to about 100 megapascals.

17. The electronic apparatus of claim 1, wherein a thickness of the base layer is about 10 micrometers to about 100 micrometers.

18. An electronic apparatus comprising:

a display module including:

non-folding areas arranged along a first direction; and a folding area disposed between the non-folding areas and foldable along a virtual folding axis extended along a second direction crossing the first direction;

a lower plate which is disposed on a lower portion of the display module and in which lower openings overlapping the folding area are defined; and a digitizer disposed on a lower portion of the lower plate, the digitizer including:

a base layer comprising a first upper surface and a first lower surface opposing the first upper surface;

a first cover layer disposed on the first upper surface of the base layer and including a first portion and a second portion spaced apart from each other to expose a portion of the base layer in the folding area;

first sensing coils disposed on a lower portion of the first cover layer;

second sensing coils insulated from the first sensing coils;

a second cover layer disposed on the lower portion of the first cover layer; and at least one of a first adhesive layer disposed between the first upper surface and the first cover layer and in contact with the first sensing coils or a second adhesive layer disposed between the first lower surface and the second cover layer and in contact with the second sensing coils, wherein in the first direction, a first width between the first portion and the second portion is smaller than a second width of the folding area, and the first adhesive layer exposes the first upper surface in the folding area and the second adhesive layer exposes the first lower surface in the folding area.

19. The electronic apparatus of claim 18, wherein the second cover layer comprises a third portion overlapping the first portion and a fourth portion spaced apart from the third portion with the first width and exposing another portion of the base layer in the folding area.

20. The electronic apparatus of claim 19, wherein in a non-folding state, the first width is about 0.5 millimeter to about 4 millimeters, and the second width is about 5 millimeters to about 50 millimeters.

21. The electronic apparatus of claim 18, wherein the first sensing coils are disposed on the first upper surface, and the second sensing coils are disposed on the first lower surface;

the first cover layer faces the first upper surface and covers the first sensing coils; and the second cover layer faces the first lower surface and covers the second sensing coils.

22. The electronic apparatus of claim 21, further comprising:

both of the first adhesive layer and the second adhesive layer.

23. The electronic apparatus of claim 18, wherein the second cover layer comprises a second upper surface facing the first cover layer and a second lower surface opposing the second upper surface, wherein:

the first sensing coils are disposed on the second upper surface, and the second sensing coils are disposed on the second lower surface;

the first cover layer faces the second upper surface and covers the first sensing coils; and the base layer is disposed on the second lower surface and contacts the second sensing coils.

24. The electronic apparatus of claim 23, wherein the first adhesive layer is disposed between the second upper surface and the first cover layer and is in contact with the first sensing coils.

25. The electronic apparatus of claim 18, wherein:

the first cover layer comprises a third upper surface facing the lower plate and a third lower surface opposing the third upper surface; and the second cover layer comprises a fourth upper surface facing the first cover layer and a fourth lower surface opposing the fourth upper surface, wherein:

the first sensing coils are disposed on the third lower surface, and the second sensing coils are disposed on the fourth lower surface; and the base layer is disposed on the fourth lower surface and contacts the second sensing coils.

26. The electronic apparatus of claim 25, wherein the first adhesive layer is disposed between the third lower surface and the fourth upper surface and is in contact with the first sensing coils.

27. The electronic apparatus of claim 18, wherein the digitizer comprises a first digitizer overlapping one of the non-folding areas and a second digitizer overlapping a remaining one of the non-folding areas and spaced apart from the first digitizer in the first direction in the folding area.

28. The electronic apparatus of claim 18, wherein the base layer comprises a synthetic rubber and a cross-linkable composition, wherein the synthetic rubber includes at least one of butadiene rubber, styrene-butadiene rubber, or butyl rubber.

* * * * *